United States Patent
Liao

(10) Patent No.: US 10,459,323 B2
(45) Date of Patent: Oct. 29, 2019

(54) PROJECTOR AND ILLUMINATION SYSTEM THEREOF

(71) Applicant: Coretronic Corporation, Hsin-Chu (TW)

(72) Inventor: Chien-Chung Liao, Hsin-Chu (TW)

(73) Assignee: Coretronic Corporation, Hsin-Chu (TW)

( * ) Notice: Subject to any disclaimer, the term of this patent is extended or adjusted under 35 U.S.C. 154(b) by 0 days.

(21) Appl. No.: 15/953,377

(22) Filed: Apr. 13, 2018

(65) Prior Publication Data

US 2018/0299757 A1 Oct. 18, 2018

(30) Foreign Application Priority Data

Apr. 14, 2017 (CN) .......................... 2017 1 0244094

(51) Int. Cl.
*G03B 21/20* (2006.01)
*G03B 33/08* (2006.01)

(52) U.S. Cl.
CPC ......... *G03B 21/204* (2013.01); *G03B 21/206* (2013.01); *G03B 21/2066* (2013.01); *G03B 33/08* (2013.01); *G03B 21/208* (2013.01)

(58) Field of Classification Search
CPC ................ G03B 21/204; G03B 21/206; G03B 21/2066; G03B 21/208; G03B 33/08; G03B 21/2013; F21S 10/007; H04N 9/3158; F21V 13/14
See application file for complete search history.

(56) References Cited

U.S. PATENT DOCUMENTS

| 9,348,200 | B2 * | 5/2016 | Takahashi | G03B 21/142 |
| 2013/0044296 | A1 * | 2/2013 | Hsu | H04N 9/3161 |
| | | | | 353/33 |
| 2013/0322056 | A1 * | 12/2013 | Konuma | F21V 13/14 |
| | | | | 362/84 |
| 2017/0199451 | A1 * | 7/2017 | Akiyama | G02B 26/008 |
| 2018/0157157 | A1 * | 6/2018 | Wu | G03B 21/2033 |

FOREIGN PATENT DOCUMENTS

| CN | 202351606 U | 7/2012 |
| CN | 204593250 U | 8/2015 |
| CN | 103792768 B | 9/2015 |
| CN | 205384439 U | 7/2016 |

* cited by examiner

*Primary Examiner* — Peggy A Neils

(57) ABSTRACT

An illumination system includes a lens group having an optical axis and a light flux cross-section perpendicular to the optical axis, a dichroic device including first and second dichroic layers, first and second excitation light sources and a phosphor wheel. The first and second dichroic layers reflect first and second excitation beams to the lens group respectively. A projection region collectively formed by projecting the first dichroic layer and the second dichroic layer on the light flux cross-section in a direction parallel to the optical axis is larger than a ¼ area of the light flux cross-section and smaller than a ½ area of the light flux cross-section. The phosphor wheel receives the first and second excitation beams passing through the lens group and has a reflective region and at least one phosphor region.

47 Claims, 18 Drawing Sheets

PROJECTOR AND ILLUMINATION SYSTEM THEREOF

CROSS-REFERENCE TO RELATED APPLICATION

This application claims the priority benefit of China Application (CN201710244094.0 filed on Apr. 14, 2017). The entirety of the above-mentioned patent application is hereby incorporated by reference herein and made a part of this specification.

FIELD OF THE INVENTION

The invention relates to a display device, and more particularly to a projector and an illumination system thereof.

BACKGROUND OF THE INVENTION

A conventional digital light processing (DLP) projector includes an illumination system, a digital micro-mirror device (DMD) and a projection lens. The illumination system is used to provide an illumination beam, the digital micro-mirror device is used to convert the illumination beam into an image beam, and the projection lens is used to project the image beam onto a screen to form an image screen on the screen. In addition, with the development of illumination technology, most of the aforementioned projectors have employed laser sources as the light source of the illumination system, wherein the laser source can be a laser diode (LD).

FIG. 1 is a schematic view of a conventional illumination system employing a laser source. Referring to FIG. 1. In the illumination system 100, the laser source module 110 can emit a blue beam 112. The blue beam 112 is irradiated to the phosphor wheel 140 after passing through the collimating element 122, the dichroic mirror 130 and the lenses 123, 124 sequentially. The phosphor wheel 140 can be rotated and has a reflective portion, a green phosphor region, a yellow phosphor region and a transmissive region or an opening region (these elements of the phosphor wheel 140 are not shown), and the green phosphor region and the yellow phosphor region both are formed on the reflective portion.

When the blue beam 112 is individually irradiated to the green phosphor region and the yellow phosphor region, the green beam 113 and the yellow beam 114 are excited from the green phosphor region and the yellow phosphor region respectively, and the reflective portion reflects the green light beam 113 and the yellow light beam 114 to the dichroic mirror 130. The green light beam 113 and the yellow light beam 114 are reflected by the dichroic mirror 130, pass through the lens 125, and are irradiated to the rotatable color wheel 150. The opening region of the phosphor wheel 140 may allow the blue beam 112 to penetrate. After passing through the opening region, the blue beam 112 passes through the lenses 126, 127, the reflective portions 161, 162, the lens 128, the reflective portion 163, the lens 129, the dichroic mirror 130 and the lens 125. Thereafter, the blue beam 112 is irradiated to the color wheel 150.

The color wheel 150 has a red filter region, a green filter region, a transparent region and a diffusion region. The yellow phosphor region corresponds to the red filter region and the transparent region, the green phosphor region corresponds to the green filter region, and the opening region corresponds to the diffusion region. The color wheel 150 and the phosphor wheel 140 are rotatably engaged with each other so that the green beam 113 is irradiated to the green filter region, the yellow beam 114 is irradiated to the red filter region and the transparent region, and the blue beam 112 is irradiated on the diffusion region. The color light beams filtered by the color wheel 150 are a blue beam, a green beam and a red beam for forming a color image and a yellow beam for increasing the luminance. Each of the color light beams enters the optical integration rod 170.

However, from the above description, it is known that the conventional illumination system 100 requires many optical elements (e.g., a plurality of lenses 123 to 128) and the optical layout of the illumination system 100 is complicated, thus, the conventional illumination system 100 has some disadvantages such as high cost, large volume and poor optical efficiency.

The information disclosed in this "BACKGROUND OF THE INVENTION" section is only for enhancement understanding of the background of the invention and therefore it may contain information that does not form the prior art that is already known to a person of ordinary skill in the art. Furthermore, the information disclosed in this "BACKGROUND OF THE INVENTION" section does not mean that one or more problems to be solved by one or more embodiments of the invention were acknowledged by a person of ordinary skill in the art.

SUMMARY OF THE INVENTION

The invention provides an illumination system having fewer optical elements and a simplified optical design, thereby helping to reduce cost and volume.

The invention further provides a projector including the aforementioned illumination system.

Other advantages of the invention may be further understood from the technical features disclosed below.

An illumination system provided by an embodiment of the invention includes a lens group, a dichroic device, a first excitation light source, a second excitation light source and a phosphor wheel. The lens group has an optical axis and a light flux cross-section perpendicular to the optical axis. The dichroic device includes a first dichroic layer and a second dichroic layer. The first dichroic layer is for reflecting a first excitation beam to the lens group. The second dichroic layer is for reflecting a second excitation beam to the lens group. A projection region collectively formed by projecting the first dichroic layer and the second dichroic layer on the light flux cross-section in a direction parallel to the optical axis is larger than a ¼ area of the light flux cross-section and smaller than a ½ area of the light flux cross-section, and the optical axis does not pass through the first dichroic layer and the second dichroic layer. The first excitation light source is for emitting the first excitation beam toward the first dichroic layer. The second excitation light source is for emitting the second excitation beam toward the second dichroic layer. The phosphor wheel is for receiving the first excitation beam and the second excitation beam passing through the lens group and has a reflective region and at least one phosphor region. The at least one phosphor region is for converting the first excitation beam and the second excitation beam into a conversion beam and reflecting the conversion beam to the lens group. The reflective region is for reflecting the first excitation beam and the second excitation beam back to the lens group. The conversion beam penetrates the first dichroic layer and the second dichroic layer. An illumination system provided by another embodiment of the invention includes a first excitation light source, a first supplemental light source, a lens group, a dichroic device and a phosphor wheel. The first excitation light source is for emitting a first excitation beam. The first supplemental light source is for emitting a first supplemental beam. A difference between the wavelengths of the first excitation beam and the first supplemental beam is between 50 nm and 300 nm. The lens group has an optical axis and a light flux cross-section perpendicular to the optical axis. The dichroic device includes a first dichroic layer and a second dichroic layer. The first dichroic layer is for reflecting the first excitation beam to the lens group. The second dichroic layer is for reflecting the first supplemental beam. A projection region collectively formed by projecting the first dichroic layer and the second dichroic layer on the light flux cross-section in a direction parallel to the optical axis is larger than a ¼ area of the light flux cross-section and smaller than a ½ area of the light flux cross-section, and the optical axis does not pass through the first dichroic layer and the second dichroic layer. The phosphor wheel is for converting the first excitation beam passing through the lens group into a conversion beam and reflecting the conversion beam to the lens group, wherein the conversion beam penetrates the first dichroic layer and the second dichroic layer.

A projector provided by an embodiment of the invention includes the aforementioned illumination system, a light valve unit and a projection lens. The light valve unit is disposed on a transmission path of the illumination beam to convert the illumination beam into an image beam. The projection lens is disposed on a transmission path of the image beam.

In summary, since the projection region formed by the first and second dichroic layers on the light flux cross-section is not passed through by the optical axis of the lens group and the area of the projection region is larger than the ¼ area of the light flux cross-section and smaller than the ½ area of the light flux cross-section, so that the axes of the first and second excitation beams and the optical axis of the lens group are noncoaxial. Thus, the lens group can deflect the first and second excitation beams, so that the first and second excitation beams emitted from the phosphor wheel are not completely blocked by the first and second dichroic layers, and therefore the first excitation beam, the second excitation beam and the conversion beam can be converted into the illumination beam. Compared with the conventional illumination systems (as shown in FIG. 1), the invention clearly employs fewer optical elements and has a simpler optical layout, thereby helping to reduce cost and volume.

Other objectives, features and advantages of the invention will be further understood from the further technological features disclosed by the embodiments of the invention wherein there are shown and described preferred embodiments of this invention, simply by way of illustration of modes best suited to carry out the invention.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DETAILED DESCRIPTION OF PREFERRED EMBODIMENTS

In the following detailed description of the preferred embodiments, reference is made to the accompanying drawings which form a part hereof, and in which is shown by way of illustration specific embodiments in which the invention may be practiced. In this regard, directional terminology, such as "top", "bottom", "front", "back", etc., is used with reference to the orientation of the Figure(s) being described. The components of the invention can be positioned in a number of different orientations. As such, the directional terminology is used for purposes of illustration and is in no way limiting. On the other hand, the drawings are only schematic, and the sizes of components may be exaggerated for clarity. It is to be understood that other embodiments may be utilized, and structural changes may be made, without departing from the scope of the invention. Also, it is to be understood that the phraseology and terminology used herein are for the purpose of description and should not be regarded as limiting. The use of "including", "comprising", or "having" and variations thereof herein is meant to encompass the items listed thereafter and equivalents thereof as well as additional items. Unless limited otherwise, the terms "connected", "coupled", and "mounted" and variations thereof herein are used broadly and encompass direct and indirect connections, couplings, and mountings. Similarly, the terms "facing," "faces" and variations thereof herein are used broadly and encompass direct and indirect facing, and "adjacent to" and variations thereof herein are used broadly and encompass directly and indirectly "adjacent to". Therefore, the description of "A" component facing "B" component herein may contain the situations that "A" component directly faces "B" component or one or more additional components are between "A" component and "B" component. Also, the description of "A" component "adjacent to" "B" component herein may contain the situations that "A" component is directly "adjacent to" "B" component or one or more additional components are between "A" component and "B" component. Accordingly, the drawings and descriptions will be regarded as illustrative in nature and not as restrictive.

Figure 1:
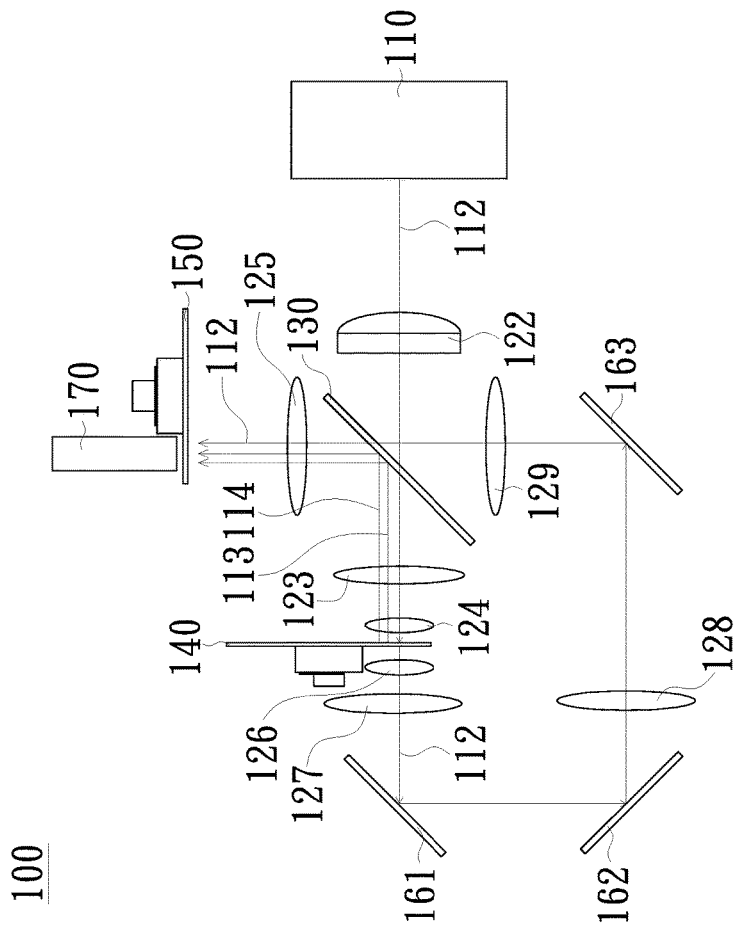
FIG. 1 is a schematic view of a conventional illumination system employing a laser source.
Figure 2A:
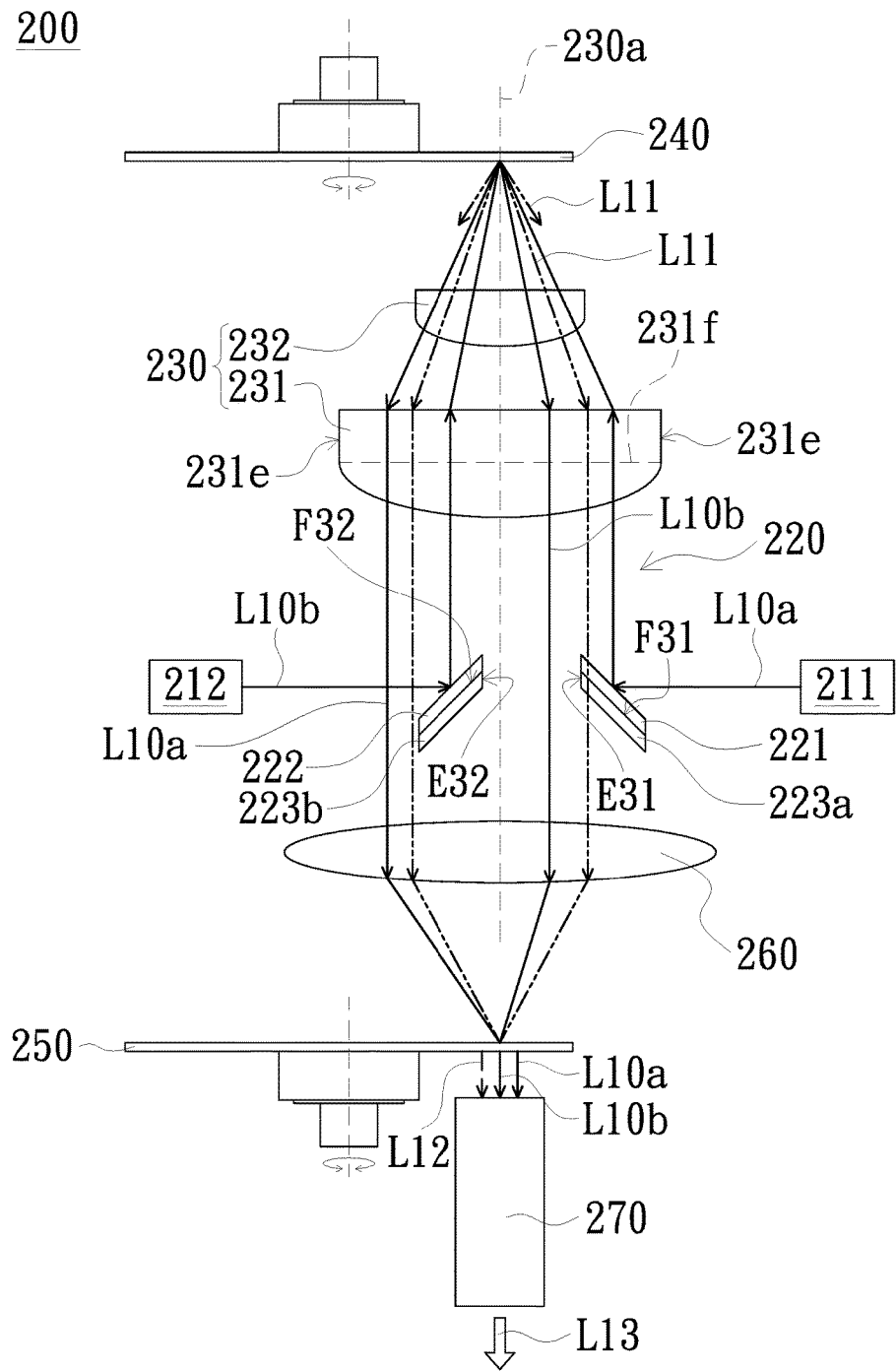
FIG. 2A is a schematic view of an illumination system in accordance with an embodiment of the invention.

FIG. 2A is a schematic view of an illumination system in accordance with an embodiment of the invention. As shown in FIG. 2A, the illumination system 200 includes two light sources, a dichroic device 220 and a lens group 230, wherein the two light sources are a first excitation light source 211 and a second excitation light source 212. The dichroic device 220 includes a first dichroic layer 221 and a second dichroic layer 222. The first excitation light source 211 emits a first excitation beam L10a toward the first dichroic layer 221 and the second excitation light source 212 emits a second excitation beam L10b toward the second dichroic layer 222. The first excitation light source 211 and the second excitation light source 212 both may be laser light sources such as laser diodes, so that the first excitation beam L10a and the second excitation beam L10b may be laser beams. Or, the first excitation light source 211 and the second excitation light source 212 both may be light emitting diode (LED) light sources.

In addition, the first excitation light source 211 and the second excitation light source 212 may be laser light sources with the same wavelength, so that the wavelength of the first excitation beam L10a may be the same as the wavelength of the second excitation beam L10b. For example, the first excitation beam L10a and the second excitation beam L10b may be the same blue beam having a wavelength of 445 nm or 455 nm for example. However, the first excitation light source 211 and the second excitation light source 212 may be two kinds of laser sources with different wavelengths; that is, the wavelength of the first excitation beam L10a may be different from the wavelength or color of the second excitation beam L10b.

Specifically, when the wavelength of the first excitation beam L10a is different from the wavelength of the second excitation beam L10b, the difference between the wavelengths of the first excitation beam L10a and the second excitation beam L10b is between 10 nm and 100 nm. For example, the first excitation beam L10a may be a blue light having a wavelength of 445 nm or 455 nm, and the second excitation beam L10b may be an ultraviolet light having a wavelength of 354 nm or a blue light having a wavelength of 454 nm. Therefore, at least one of the first excitation beam L10a and the second excitation beam L10b may be an invisible light (e.g., ultraviolet light), and the first excitation beam L10a and the second excitation beam L10b are not limited to a visible light.

The first dichroic layer 221 and the second dichroic layer 222 can reflect a beam of a specific wavelength range and allow a beam of another specific wavelength range to penetrate. For example, the first dichroic layer 221 is disposed on the transmission path of the first excitation beam L10a and reflects the first excitation beam L10a to the lens group 230, and the second dichroic layer 222 is disposed on the transmission path of the second excitation beam L10b and reflects the second excitation beam L10b to the lens group 230. The first dichroic layer 221 and the second dichroic layer 222 may be dichroic mirrors or interference filter films and have an optical multilayer structure. The dichroic device 220 may further include transparent substrates 223a and 223b. The transparent substrates 223a and 223b are, for example, glass plates or acrylic plates and have planes F31 and F32, respectively. The first dichroic layer 221 and the second dichroic layer 222 are formed on the planes F31 and F32 and completely cover the plane F31 and F32, respectively.

The lens group 230 is disposed on the transmission path of the first excitation beam L10a and the second excitation beam L10b and may include at least one lens. Taking FIG. 2A as an example, the lens group 230 includes two lenses 231 and 232. However, in other embodiments, the lens group 230 may include only one lens or three or more lenses. Therefore, the number of lenses included in the lens group 230 is not limited to two as shown in FIG. 2A. In the embodiment of FIG. 2A, the first excitation beam L10a and the second excitation beam L10b sequentially pass through the lens 231 and the lens 232. The lenses 231 and 232 overlap each other, and the size of the lens 231 is larger than the size of the lens 232. The lens 232 does not protrude the edge 231e of the lens 231; that is, the lens 232 does not cover the edge 231e of the lens 231, thereby controlling the light divergence angles of the first excitation beam L10a and the second excitation beam L10b.

The lens group 230 has an optical axis 230a. The optical axis 230a penetrates the lenses 231 and 232 along the axes of the lenses 231 and 232, so that the lenses 231 and 232 are coaxial with each other. In addition, the transparent substrates 223a and 223b may have beveled edges E31 and E32, respectively; wherein the beveled edges E31 and E32 are parallel to the optical axis 230a. In addition, the lens group 230 further has a light flux cross-section 231f. The optical axis 230a is perpendicular to the light flux cross-section 231f and passes through the light flux cross-section 231f, wherein the optical axis 230a passes through the center position of the light flux cross-section 231f.

The first excitation beam L10a and the second excitation beam L10b both pass through the light flux cross-section 231f, but the axes of the first excitation beam L10a and the second excitation beam L10b do not overlap the optical axis 230a. The axis of the first excitation beam L10a refers to the axis of the main ray of the first excitation beam L10a and the axis of the second excitation beam L10b refers to the axis of the main ray of the second excitation beam L10b. Therefore, the axes of the first excitation beam L10a and the second excitation beam L10b are noncoaxial with the optical axis 230a of the lens group 230, so that the lens group 230 can deflect the traveling direction of the first excitation beam L10a and the second excitation beam L10b, as shown in FIG. 2A. In addition, the drawings of the invention show the first excitation beam L10a and the second excitation beam L10b in a straight line, and the straight line can be regarded as the axis of the main ray of the first excitation beam L10*a* and the main ray of the second excitation beam L10*b*. Therefore, as shown in FIG. 2A, it is apparent that the axes of the first excitation beam L10*a* and the second excitation beam L10*b* are noncoaxial with the optical axis 230*a* of the lens group 230, so that the first excitation beam L10*a* and the second excitation beam L10*b* can be deflected by the lens group 230, as shown in FIG. 2A.

Figure 2B:
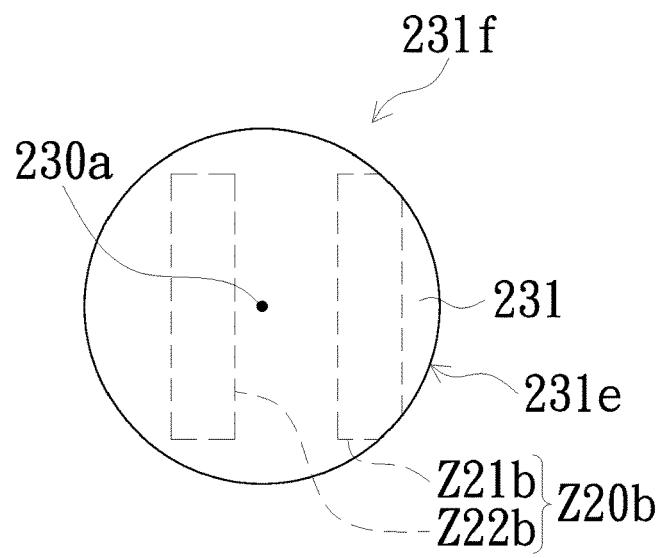
FIG. 2B is a schematic view of the projection region collectively formed by the first dichroic layer and the second dichroic layer on the light flux cross-section in FIG. 2A.

Referring to FIGS. 2A and 2B. FIG. 2B is a schematic side view of the lens group 230 taken along the optical axis 230*a* and from bottom to top in FIG. 2A. Since the size of the lens 231 is larger than the size of the lens 232 and the lens 231 and the lens 232 are coaxial with each other, the lens 231 completely covers the lens 232 in FIG. 2B and so that only the lens 231 is shown in FIG. 2B. The light flux cross-section 231*f* is an imaginary plane of the lens group 230, and the contour of the light flux cross-section 231*f* is equivalent to the edge of the lens having the largest size in the lens group 230. Taking FIG. 2B as an example. The contour of the light flux cross-section 231*f* is equivalent to the edge 231*e* of the lens 231. That is, the region surrounded by the edge 231*e* is equivalent to the light flux cross-section 231*f* in FIG. 2B.

The dichroic device 220 overlaps the lens group 230, so that the first dichroic layer 221 and the second dichroic layer 222 collectively form a projection region Z20*b* on the light flux cross-section 231*f* in the direction parallel to the optical axis 230*a*. Taking FIGS. 2A and 2B as an example. The projection region Z20*b* includes two overlapping regions Z21*b* and Z22*b*, wherein the overlapping region Z21*b* is formed by projecting the first dichroic layer 221 on the light flux cross-section 231*f* in the direction parallel to the optical axis 230*a*, and the overlapping region Z22*b* is formed by projecting the second dichroic layer 222 on the light flux cross-section 231*f* in the direction parallel to the optical axis 230*a*.

The overlapping region Z21*b* and the overlapping region Z22*b* are bar-shaped and separated from each other, so that the area of the projection region Z20*b* is equal to the area of the overlapping region Z21*b* added by the area of the overlapping region Z22*b*. As shown in FIG. 2B, the area of the projection region Z20*b* is clearly larger than the ¼ area of the light flux cross-section 231*f* (i.e., the region surrounded by the edge 231*e*) and smaller than the ½ area of the light flux cross-section 231*f*. In addition, the optical axis 230*a* does not pass through the projection region Z20*b*, that is, the optical axis 230*a* does not pass through the first dichroic layer 221 and the second dichroic layer 222.

It is to be noted that in the embodiment of FIG. 2B, the first dichroic layer 221 and the second dichroic layer 222 do not overlap with each other in the direction parallel to the optical axis 230*a*, so that the projection region Z20*b* includes two separated overlapping regions Z21*b* and Z22*b*. In other embodiments, however, t the first dichroic layer 221 and the second dichroic layer 222 may overlap each other in the direction parallel to the optical axis 230*a*, so that the overlapping regions Z21*b* and Z22*b* overlap each other; that is, the area of the projection region Z20*b* may not be equal to the area of the overlapping region Z21*b* added by the area of the overlapping region Z22*b*.

Figure 2C:
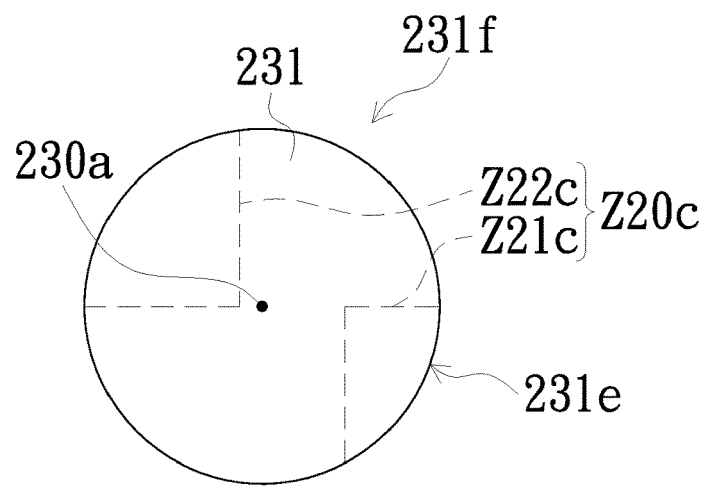
FIG. 2C is a schematic view of another projection region collectively formed by the first dichroic layer and the second dichroic layer on the light flux cross-section in FIG. 2A.

FIG. 2C is a schematic view of another projection region collectively formed by the first dichroic layer and the second dichroic layer on the light flux cross-section in FIG. 2A. Referring to FIGS. 2A and 2C. In addition to the projection region Z20*b* shown in FIG. 2B, the first dichroic layer 221 and the second dichroic layer 222 may collectively form the projection region Z20*c* on the light flux cross-section 231*f* in the direction parallel to the optical axis 230*a*. The projection region Z20*c* includes overlapping regions Z21*c* and Z22*c*, as shown in FIG. 2C. Unlike the bar-shaped overlapping regions Z21*b* and Z22*b* in FIG. 2B, the overlapping regions Z21*c* and Z22*c* both are fan-shaped in FIG. 2C. Therefore, the aforementioned overlapping region may have various shapes, such as the bar-shaped overlapping regions Z21*b* and Z22*b* of the fan-shaped overlapping regions Z21*c* and Z22*c*. In addition, as shown in FIG. 2C, the area of the projection region Z20*c* is clearly larger than the ¼ area of the light flux cross-section 231*f* and smaller than the ½ area of the light flux cross-section 231*f*, and the optical axis 230*a* does not pass through the projection region Z20*c*.

Referring to FIG. 2A. The illumination system 200 further includes a phosphor wheel 240 disposed on the transmission path of the first excitation beam L10*a* and the second excitation beam L10*b*. The lens group 230 is disposed between the dichroic device 220 and the phosphor wheel 240, so that the phosphor wheel 240 can receive the first excitation beam L10*a* and the second excitation beam L10*b* passing through the lens group 230. The phosphor wheel 240 can be rotated relative to the dichroic device 220, so that the first excitation beam L10*a* and the second excitation beam L10*b* can be irradiated at a plurality of different sections of the phosphor wheel 240.

At least one section of the phosphor wheel 240 can convert the first excitation beam L10*a* and the second excitation beam L10*b* into at least one conversion beam L11 and reflect the conversion beam L11 to the lens group 230. Another section of the phosphor wheel 240 can directly reflect the first excitation beam L10*a* and the second excitation beam L10*b* back to the lens group 230, so that the first excitation beam L10*a*, the second excitation beam L10*b* and the conversion beam L11 all pass through the light flux cross-section 231*f*. The conversion beam L11 can penetrate the dichroic device 220, that is, the conversion beam L11 penetrates the first dichroic layer 221 and the second dichroic layer 222.

Figure 2D:
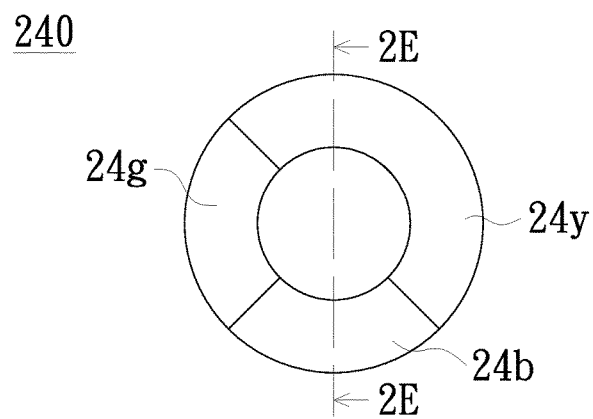
FIG. 2D is a schematic front view of the phosphor wheel in FIG. 2A.

FIG. 2D is a schematic front view of the phosphor wheel in FIG. 2A. Referring to FIGS. 2A and 2D. The phosphor wheel 240 has a reflective region 24*b*, and the reflective region 24*b* can sequentially reflect the first excitation beam L10*a* and the second excitation beam L10*b* back to the lens group 230. It is to be noted that when the wavelength of the first excitation beam L10*a* is different from the wavelength of the second excitation beam L10*b*, for example, the difference between the wavelengths of the first excitation beam L10*a* and the second excitation beam L10*b* is between 10 nm and 100 nm, the first dichroic layer 221 and the second dichroic layer 222 may be both located on the transmission path of the first excitation beam L10*a* and the second excitation beam L10*b*; wherein the first excitation beam L10*a* reflected by the reflective region 24*b* can penetrate the second dichroic layer 222 and the second excitation beam L10*b* reflected by the reflective region 24*b* can penetrate the first dichroic layer 221.

The phosphor wheel 240 further has at least one phosphor region. Taking the embodiment of FIG. 2D as an example. The phosphor wheel 240 has two phosphor regions 24*y* and 24*g*. The phosphor regions 24*y* and 24*g* can sequentially convert the first excitation beam L10*a* and the second excitation beam L10*b* into two conversion beams L11 having different wavelengths and reflect the conversion beams L11 to the lens group 230. For example, the conversion beam L11 converted by the phosphor region 24*y* may be a yellow light and the conversion beam L11 converted by the phosphor region 24*g* may be a green light, so that the conversion beams L11 generated by the phosphor regions 24*y* and 24*g* have different wavelengths, which allows the phosphor wheel 240 can provide a green light and a yellow light.

The conversion beams L11 (e.g., yellow light and green light) both can penetrate the dichroic device 220 and its first dichroic layer 221 and second dichroic layer 222. The phosphor wheel 240 has two phosphor regions 24*y* and 24*g* in the embodiment of FIG. 2D, however, the phosphor wheel 240 may have only one phosphor region 24*y* in other embodiments. That is, the number of phosphor regions included in the phosphor wheel 240 may be one and is not limited to be more than one.

Figure 2E:
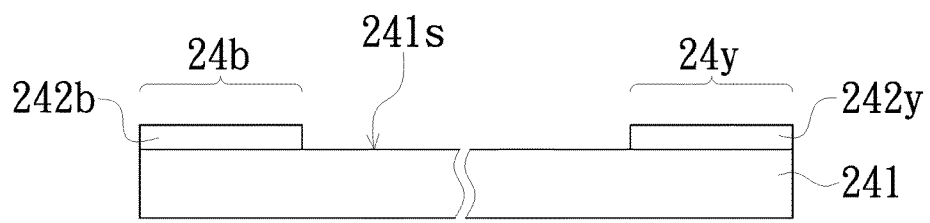
FIG. 2E is a schematic cross-sectional view of a phosphor wheel taken along the line 2E-2E in FIG. 2D.

FIG. 2E is a schematic cross-sectional view of a phosphor wheel taken along the line 2E-2E in FIG. 2D. Referring to FIGS. 2D and 2E. The phosphor wheel 240 includes a turntable 241 and at least one phosphor material. The turntable 241 may be a metal plate or a substrate coated with a reflective layer, wherein the reflective layer is a metal thin film (not shown) and the substrate is a glass plate or a ceramic plate for example. The turntable 241 has a light receiving surface 241*s* which can reflect ray, and the aforementioned phosphor material is disposed on the light receiving surface 241*s*.

In the embodiment shown of FIGS. 2D and 2E, the light receiving surface 241*s* is divided into the reflective region 24*b* and the phosphor regions 24*y* and 24*g*. The phosphor wheel 240 includes two different phosphor materials, which are a phosphor powder for example. Among the two phosphor materials, one of the phosphor materials is a phosphor material 242*y* which is disposed in the phosphor region 24*y* and may be a yellow phosphor power. The other phosphor material (not shown) is disposed in the phosphor region 24*g* and may be a green phosphor power. Thus, the two phosphor materials can convert the first excitation beam L10*a* and the second excitation beam L10*b* into different conversion beams L11, such as the yellow and green conversion beams L11. The light receiving surface 241*s* under the phosphor materials can reflect the conversion beams L11, so that the conversion beams L11 can be incident on the lens group 230.

When the aforementioned phosphor materials (including the phosphor material 242*y*) are phosphor powders, the conversion beams L11 emitted from the phosphor regions 24*y* and 24*g* are scattered light and may have a Lambertian distribution. That is, the conversion beams L11, which have just been emitted from the phosphor regions 24*y* and 24*g*, are diverging beams. The lens group 230 can collect the divergent conversion beams L11 and collimate and emit the conversion beams L11 to reduce the loss of the conversion beams L11.

The phosphor wheel 240 further includes a light diffusion film 242*b* for scattering ray. The light diffusion film 242*b* is formed on the light receiving surface 241*s* and located on the reflective region 24*b*. When the first excitation beam L10*a* and the second excitation beam L10*b* are incident on the light diffusion film 242*b*, the light diffusion film 242*b* can scatter a portion of the first excitation beam L10*a* and a portion of the second excitation beam L10*b*. Since the first excitation beam L10*a* and the second excitation beam L10*b* are laser beams, the first excitation beam L10*a* and the second excitation beam L10*b* have coherence, so that the first excitation beam L10*a* and the second excitation beam L10*b* incident on a smooth surface may generate speckles due to interference, thereby reducing the quality of image.

Therefore, the scattering of the first excitation beam L10*a* and the second excitation beam L10*b* by the light diffusion film 242*b* can reduce or destroy the impact of coherence, thereby reducing or eliminating the generation of the speckle. However, in the embodiment, the light diffusion film 242*b* may scatter only a small portion of the first excitation beam L10*a* and a small portion of the second excitation beam L10*b*. That is, to maintain a certain optical efficiency, the first excitation beam L10*a* and the second excitation beam L10*b* emitted from the light diffusion film 242*b* may not be in the Lambertian distribution.

Referring to FIGS. 2A and 2D. Since the first excitation beam L10*a* and the second excitation beam L10*b* having been deflected by the lens group 230 before being incident on the reflective region 24*b* when the first excitation beam L10*a* and the second excitation beam L10*b* are reflected back to the lens group 230 by the reflective region 24*b*, the axes of the first excitation beam L10*a* and the second excitation beam L10*b* reflected back to the lens group 230 do not pass through the first dichroic layer 221 and the second dichroic layer 222, that is, the first excitation beam L10*a* and the second excitation beam L10*b* are not directly incident on the first dichroic layer 221 and the second dichroic layer 222.

Therefore, the first dichroic layer 221 and the second dichroic layer 222 do not block all of the first excitation beam L10*a* and the second excitation beam L10*b*, and even do not block the first excitation beam L10*a* and the second excitation beam L10*b*. Thus, the first excitation beam L10*a* and the second excitation beam L10*b* emitted from the phosphor wheel 240 are not blocked by the first dichroic layer 221 and the second dichroic layer 222, so that the first excitation beam L10*a*, the second excitation beam L10*b* and the conversion beam L11 can be received by the subsequent optical elements and converted into the illumination beam L13. In addition, since the beveled edges E31 and E32 are parallel to the optical axis 230*a*, the ray incident on the transparent substrates 223*a* and 223*b* can be reduced and the optical efficiency can be increased.

Referring to FIG. 2A. The illumination system 200 may further include a light receiving member 260 and a filter wheel 250, wherein the light receiving member 260 and the filter wheel 250 are sequentially disposed on the transmission path of the first excitation beam L10*a*, the second excitation beam L10*b* and the conversion beam L11. The dichroic device 220 is disposed between the light receiving member 260 and the lens group 230, and the lens group 230 and the light receiving member 260 are disposed between the filter wheel 250 and the phosphor wheel 240, so that the first excitation beam L10*a*, the second excitation beam L10*b* and the conversion beam L11 emitted from the phosphor wheel 240 sequentially pass through the light receiving member 260 and the filter wheel 250 after passing through the lens group 230.

The light receiving member 260 can converge the first excitation beam L10*a*, the second excitation beam L10*b* and the conversion beam L11, wherein the light receiving member 260 is a convex lens for example, but is not limited thereto. The filter wheel 250 can be rotated relative to the dichroic device 220, so that the first excitation beam L10*a*, the second excitation beam L10*b* and the conversion beam L11 can be irradiated to different sections of the filter wheel 250. In one embodiment, the light emission order of the first excitation beam L10*a* and the second excitation beam L10*b* can be adjusted by modulating the time difference. The filter wheel 250 can filter the conversion beam L11 to form a plurality of filter beams L12 (only one filter beam is shown in the drawings) and the filter wheel 250 may also allow the first excitation beam L10*a* and the second excitation beam L10*b* to penetrate. In addition, the colors of the first excitation beam L10a and the second excitation beam L10b after penetrating the filter wheel 250 may not change in the embodiment, but is not limited thereto.

Figure 2F:
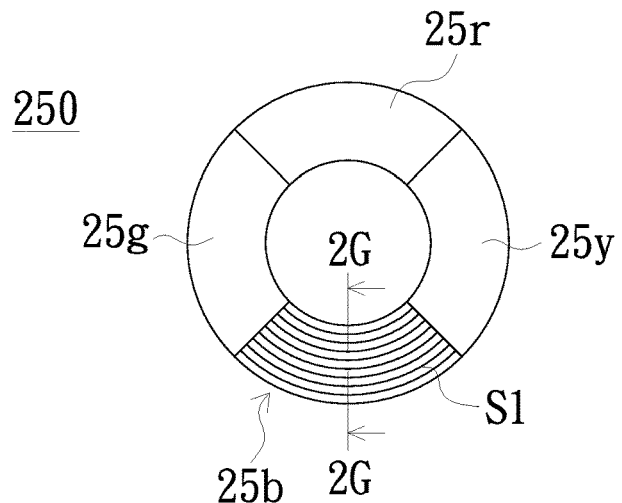
FIG. 2F is a schematic front view of the filter wheel in FIG. 2A.

FIG. 2F is a schematic front view of the filter wheel in FIG. 2A. Referring to FIGS. 2A and 2F. The filter wheel 250 may have a plurality of light penetrating portions 25b and 25y and a plurality of filter portions 25r and 25g. The light penetrating portion 25b is used to allow the first excitation beam L10a and the second excitation beam L10b to penetrate, and the light penetration portion 25y is used to allow a portion of the conversion beam L11 to penetrate. The filter portions 25r and 25g can filter the other portion of the conversion beam L11 to form the filter beams L12, wherein the filter beams L12 may be a primary color light or a beam having a color close to a primary color, but is not limited thereto.

Specifically, the conversion beams L11 incident on the filter wheel 250 may be a yellow light and a green light, respectively. The yellow conversion beam L11 penetrates the filter portion 25r and the light penetrating portion 25y, wherein the color of the yellow conversion beam L11 after penetrating the light penetrating portion 25y does not change. Since a yellow light can be formed by mixing a red light with a green light, a yellow light contains a red light and a green light. Therefore, the yellow conversion beam L11 after penetrating the filter portion 25r is converted into the red filter beam L12. The green conversion beam L11 penetrates the filter portion 25g and is converted into the green filter beam L12 by the filter portion 25g, wherein the green filter beam L12 may be a green primary color light or a beam having a color closer to a green primary color than the green light conversion beam L11 has. In addition, since a yellow light contains a red light and a green light, the green light filter beam L12 may be formed by filtering the yellow conversion beam L11 by the filter portion 25g in other embodiments, and the phosphor wheel 240 may include only one yellow phosphor material, such as the phosphor material 242y.

Figure 2G:
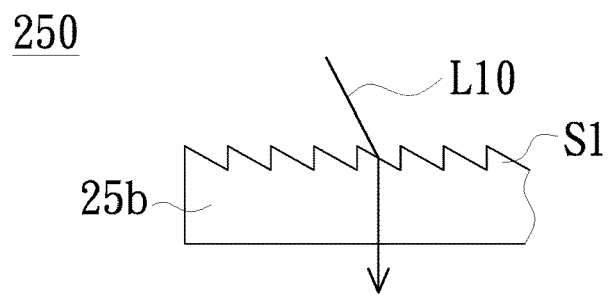
FIG. 2G is a schematic cross-sectional view of the filter wheel taken along the line 2G-2G in FIG. 2F.

FIG. 2G is a schematic cross-sectional view of the filter wheel taken along the line 2G-2G in FIG. 2F. Referring to FIGS. 2F and 2G. In the embodiment, the light penetrating portion 25b may have a surface scattering structure S1 for scattering the first excitation beam L10a and the second excitation beam L10b, so that the first excitation beams L10a and the second excitation beam L10b can be uniformly emitted from the filter wheel 250 and the speckle generated by interference can be effectively reduced or eliminated. As shown in FIG. 2G, the surface scattering structure S1 presents a serrated structure and the surface scattering structure S1 has a plurality of protrusions (not shown), wherein the shapes of the protrusions are substantially the same. The protrusions are substantially identical in width and have a width larger than 1μm, so that the surface scattering structure S1 is difficult to generate an obvious light diffraction.

In the embodiment of FIG. 2G, the protrusions are arranged in a regular manner and the surface scattering structure S1 may be the same as the surface prism rod structure of the prism sheet, so that the light penetrating portion 25b can deflect the first excitation beam L10a and the second excitation beam L10b, as shown in FIG. 2G. However, in other embodiments, the protrusions of the surface scattering structure S1 may be arranged in an irregular manner, and at least two of the protrusions may be different from each other in size (e.g., width) or shape. In addition, the protrusions of the surface scattering structure S1 may be replaced with recesses having the same size and shape. Alternatively, the protrusions of the surface scattering structure S1 may be replaced with recesses arranged in an irregular manner, wherein at least two of the recesses may be different from each other in size or shape.

Referring to FIG. 2A. The illumination system 200 further includes a light integration rod 270 located on the transmission path of the filter beam L12, the first excitation beam L10a and the second excitation beam L10b. The filter wheel 250 is located between the light integrating rod 270 and the dichroic device 220, so that the light integration rod 270 can receive and concentrate the filter beam L12, the first excitation beam L10a and the second excitation beam L10b from the filter wheel 250 and convert the filter beam L12, the first excitation beam L10a and the second excitation beam L10b into the illumination beam L13. The illumination beam L13 may be applied to the projector and may be incident on the light valve unit and the projection lens so as to be converted into the image beam capable of forming an image screen on the screen.

Figure 3A:
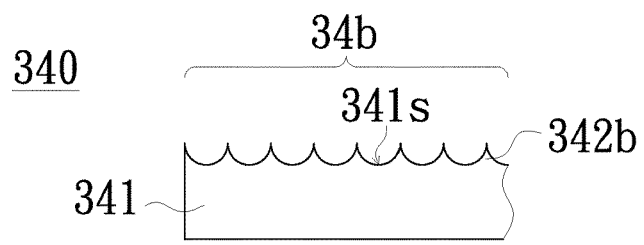
FIG. 3A is a schematic cross-sectional view of a phosphor wheel in accordance with another embodiment of the invention.

FIG. 3A is a schematic cross-sectional view of a phosphor wheel in accordance with another embodiment of the invention. Referring to FIG. 3A. The phosphor wheel 340 of FIG. 3A is similar to the phosphor wheel 240 of FIG. 2E, and the phosphor wheel 340 also has a reflective region 34b and at least one phosphor region (not shown) and includes a turntable 341 and a phosphor material (not shown). Since the phosphor wheels 340 and 240 are similar, the same structural features of the two are not described repeatly, and FIG. 3A only illustrates the difference between the two, i.e., the reflective region 34b of the phosphor wheel 340.

Specifically, the turntable 341 has an optical microstructure 342b. The optical microstructure 342b is formed on the light receiving surface 341s and located in the reflective region 34b. The optical microstructure 342b can scatter the first excitation beam L10a and the second excitation beam L10b, and the optical microstructure 342b may be a plurality of recesses (not labeled) formed on the light receiving surface 341s, as shown in FIG. 3A. The size of the recess of the optical microstructure 342b may be the same as the size of the protrusion of the surface scattering structure S1 in FIG. 2G, so that the optical microstructure 342b is also difficult to generate an obvious light diffraction.

In the embodiment of FIG. 3A, the shapes of the recesses of the optical microstructure 342b may be substantially the same, and the recesses may have substantially the same width and may be arranged in a regular manner. However, the recesses may be arranged in an irregular manner in the optical microstructures 342b of other embodiments, wherein at least two of the recesses may be different from each other in size or shape. In addition, the optical microstructure 342b may be a plurality of protrusions formed on the light receiving surface 341s, and its structure is the same as the surface scattering structure S1 in FIG. 2G.

Figure 4A:
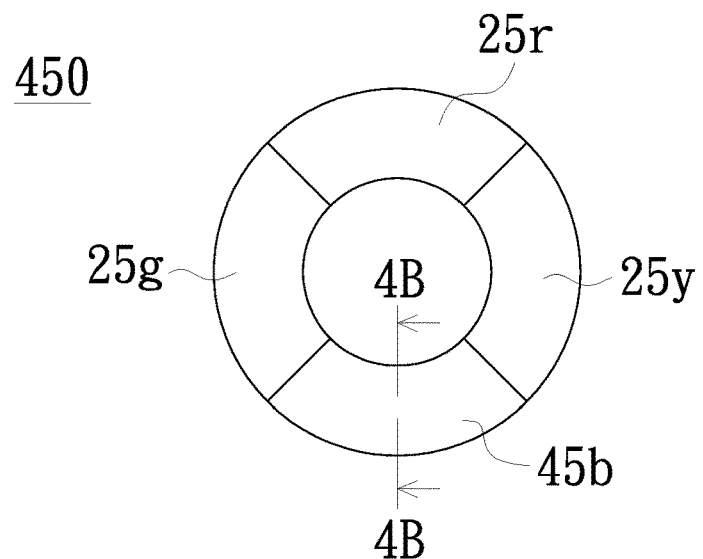
FIG. 4A is a schematic front view of a filter wheel in accordance with another embodiment of the invention.
Figure 4B:
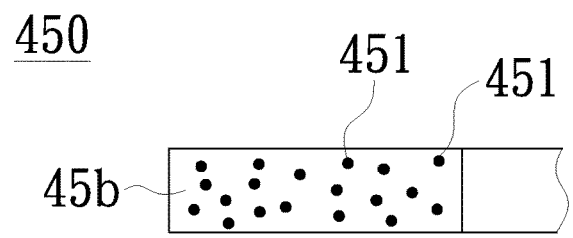
FIG. 4B is a schematic cross-sectional view of a filter wheel taken along the line 4B-4B in FIG. 4A.

FIG. 4A is a schematic front view of a filter wheel in accordance with another embodiment of the invention and FIG. 4B is a schematic cross-sectional view of a filter wheel taken along the line 4B-4B in FIG. 4A. Referring to FIGS. 4A and 4B. The filter wheel 450 of FIG. 4A is similar to the filter wheel 250 of FIG. 2F. For example, the filter wheel 450 also has a plurality of light penetrating portions 45b and 25y and a plurality of filter portions 25r and 25g. However, unlike the filter wheel 250, the light penetrating portion 45b of the filter wheel 450 has a plurality of light scattering particles 451. The light scattering particles 451 function similarly to the surface scattering structure S1 in FIG. 2G, that is, the light scattering particles 451 are used to scatter the first excitation beam L10a and the second excitation beam L10b. Therefore, it is known that the filter wheel disclosed in the embodiments of the invention may use the surface scattering structure S1 or the plurality of scattering particles 451 to realize the scattering of the first excitation beam L10a and the second excitation beam L10b, such as the aforementioned filter wheels 450 and 250.

Figure 5A:
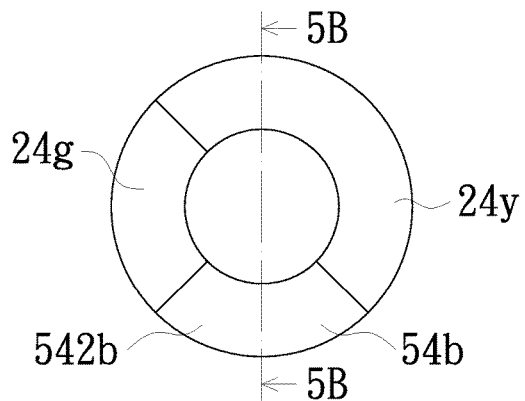
FIG. 5A is a schematic top view of a phosphor wheel in accordance with another embodiment of the invention.
Figure 5B:
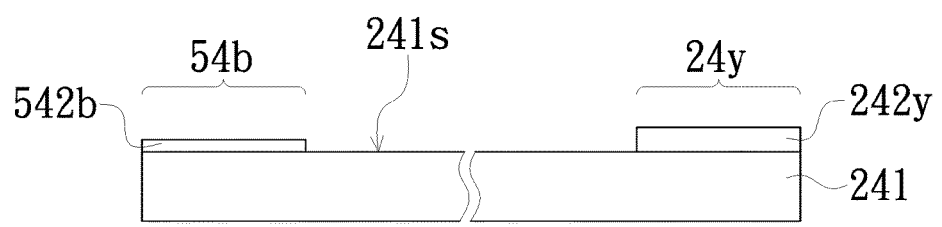
FIG. 5B is a schematic cross-sectional view of a phosphor wheel taken along the line 5B-5B in FIG. 5A.

FIG. 5A is a schematic top view of a phosphor wheel in accordance with another embodiment of the invention and FIG. 5B is a schematic cross-sectional view of a phosphor wheel taken along the line 5B-5B in FIG. 5A. Referring to FIGS. 5A and 5B. The phosphor wheel 540 of FIGS. 5A and 5B is similar to the phosphor wheel 240 of FIG. 2D. For example, the phosphor wheel 540 also has a reflective region 54b and two phosphor regions 24y and 24g and includes a turntable 241 and a phosphor material 242y. However, unlike the phosphor wheel 240, the phosphor wheel 540 further includes an auxiliary phosphor material 542b disposed in the reflective region 54b and capable of converting the first excitation beam L10a and the second excitation beam L10b into an auxiliary color light.

Taking FIG. 5B as an example. The auxiliary phosphor material 542b may be a phosphor powder and completely cover the reflective region 54b. As shown in FIG. 5B, the thickness of the auxiliary phosphor material 542b is smaller than the thickness of the phosphor material 242y. The auxiliary phosphor material 542b may be a thin layer of phosphor powder, so that the auxiliary phosphor material 542b can only convert a portion of the first excitation beam L10a and a portion of the second excitation beam L10b into the auxiliary color light, instead of converting all or most of the first excitation beam L10a and the second excitation beam L10b into the auxiliary color light. In addition, the auxiliary phosphor material 542b and the phosphor material in the phosphor region 24g may be the same phosphor power, that is, the auxiliary color light and the conversion beam L11 emitted from the phosphor region 24g have the same color.

In the embodiment, the conversion beam L11 emitted from the phosphor region 24g may be a green light, and the auxiliary color light may be a green light too. At least one of the first excitation beam L10a and the second excitation beam L10b may be a blue light having a wavelength of 445 nm or 454 nm, and this blue light is actually a purplish blue light. However, the auxiliary phosphor material 542b converts a portion of the first excitation light beam L10a and a portion of the partial second excitation light beam L10b into an auxiliary color light (green light), therefore, the first excitation beam L10a, the second excitation beam L10b and the auxiliary color light are mixed with each other to form a beam having a color close to the blue primary color or a blue primary color light, thereby enhancing the image color.

Figure 6:
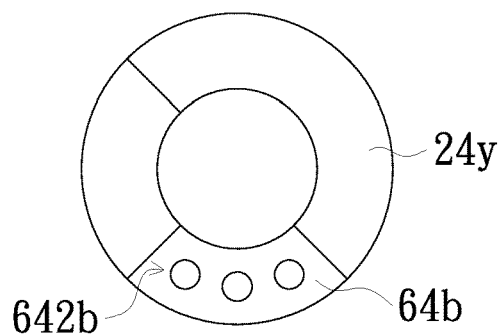
FIG. 6 is a schematic view of a phosphor wheel in accordance with another embodiment of the invention.

FIG. 6 is a schematic view of a phosphor wheel in accordance with another embodiment. The phosphor wheel 640 is similar to the phosphor wheel 540 of FIG. 5A and also has a reflective region 64b. The phosphor wheel 640 and the phosphor wheel 540 have the same function and can convert a portion of the first excitation beam L10a and a portion of the second excitation beam L10b into an auxiliary color light. However, unlike the phosphor wheel 540, although the phosphor wheel 640 also includes an auxiliary phosphor material 642b disposed in the reflective region 64b, the auxiliary phosphor material 642b partially covers the reflective region 64b, that is, the auxiliary phosphor material 642b does not completely cover the reflective region 64b. Taking FIG. 6 as an example. The auxiliary phosphor material 642b is distributed in the reflective region 64b in dotted form. It is understood that the auxiliary phosphor material 642b may also be formed in the reflective region 64b in other distributions, such as a fringe distribution or a grid distribution. That is, the auxiliary phosphor material 642b is not limited to a dotted distribution.

The thickness of the auxiliary phosphor material 642b may be the same as the thickness of the phosphor material 242y in the phosphor region 24y (not shown in FIG. 6), that is, the thickness of the auxiliary phosphor material 642b of FIG. 6 may be greater than the thickness of the auxiliary phosphor material 542b of FIG. 5B. In addition, it is to be noted that the auxiliary phosphor materials 542b and 642b shown in FIGS. 5A, 5B and 6 may also be used for the phosphor wheels 240 and 340 of FIGS. 2D and 3A. That is, the auxiliary phosphor material 542b or 642b may be formed in the reflective region 24b of the phosphor wheel 240 or may be formed in the reflective region 34b of the phosphor wheel 340.

Figure 7A:
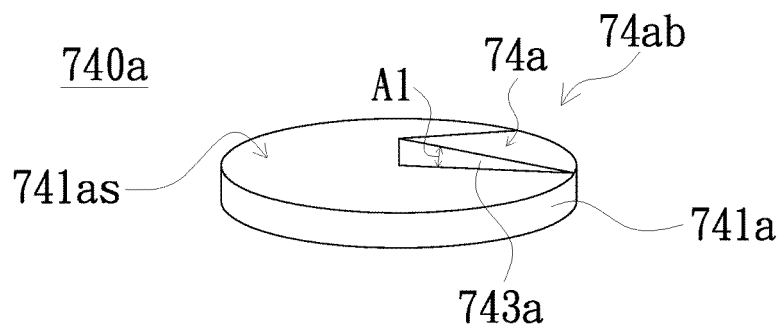
FIGS. 7A to 7C are schematic perspective views of a phosphor wheel in accordance with the other three embodiments of the invention.
Figure 7B:
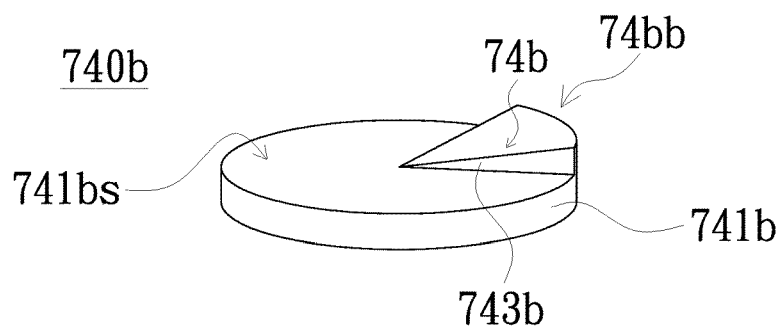
Figure 7C:
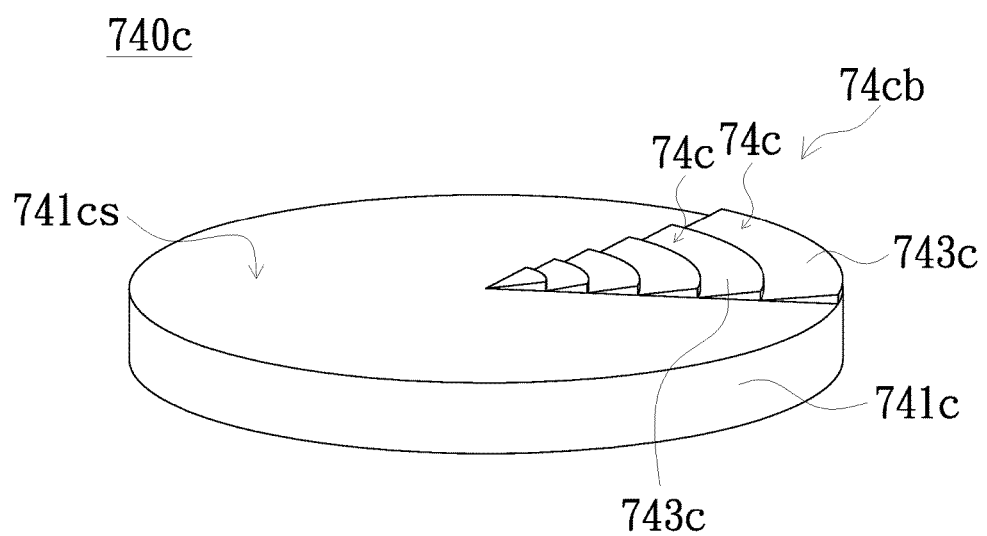

FIGS. 7A to 7C are schematic perspective views of a phosphor wheel in accordance with the other three embodiments of the invention. The phosphor wheels 740a, 740b and 740c shown in FIGS. 7A to 7C are similar to the phosphor wheels 240, 540 and 640 in the aforementioned embodiments, and the overall functions of the phosphor wheels 740a, 740b and 740c are the same. However, unlike the aforementioned phosphor wheels 240, 540 and 640, the phosphor wheels 740a, 740b and 740c have bevels 74a, 74b and 74c, respectively. The bevels 74a, 74b and 74c may be used to reflect and deflect the first excitation beam L10a and the second excitation beam L10b, thereby helping the first excitation beam L10a and the second excitation beam L10b emitted from the phosphor wheel (e.g., the phosphor wheel 240) not being blocked by the first dichroic layer 221 and the second dichroic layer 222 (see FIG. 2A).

Referring to FIG. 7A. The phosphor wheel 740a includes a turntable 741a. The turntable 741a has a light receiving surface 741as and an inclined portion 743a located on the light receiving surface 741as, wherein the inclined portion 743a is located in the reflective region 74ab. The inclined portion 743a has a bevel 74a inclined with respect to the light receiving surface 741as, wherein the angle A1 between the bevel 74a and the light receiving surface 741as may be between 0 and 10 degrees. In addition, the height of the inclined portion 743a with respect to the light receiving surface 741as decreases from the center of the turntable 741a toward the direction away from the center.

Referring to FIG. 7B. The phosphor wheel 740b is similar to the phosphor wheel 740a and also includes a turntable 741b. The turntable 741b has a light receiving surface 741bs and an inclined portion 743b located on the light receiving surface 741bs, wherein the inclined portion 743b is located in the reflective region 74bb. The inclined portion 743b has a bevel 74b inclined with respect to the light receiving surface 741bs, wherein the angle (not labeled) between the bevel 74b and the light receiving surface 741bs may be equal to the angle A1 in FIG. 7A. In addition, unlike the phosphor wheel 740a, the height of the inclined portion 743b with respect to the light receiving surface 741bs increases from the center of the turntable 741b toward the direction away from the center, as shown in FIG. 7B.

Referring to FIG. 7C. The phosphor wheel 740c is similar to the phosphor wheels 740a and 740b of the aforementioned embodiments and has a light receiving surface 741cs and a reflective region 74cb. However, unlike the phosphor wheels 740a and 740b, the turntable 741c of the phosphor wheel 740c has a plurality of inclined portions 743c located on the light receiving surface 741cs. Each of the inclined portions 743c is located in the reflective region 74cb and has a bevel 74c. Each of the bevels 74c is inclined with respect to the light receiving surface 741cs, and the angle (not labeled) between each of the bevels 74c and the light receiving surface 741cs may be equal to the angle A1. As shown in FIG. 7C, it is apparent that the inclined portions 743c are arranged in a straight line along the radius of the turntable 741c, and the height of each of the inclined portions 743c with respect to the light receiving surface 741cs increases from the center of the turntable 741c toward the direction away from the center. However, in other embodiments, the height of each of the inclined portions 743c with respect to the light receiving surface 741cs may decrease from the center of the turntable 741c toward the direction away from the center.

Figure 8:
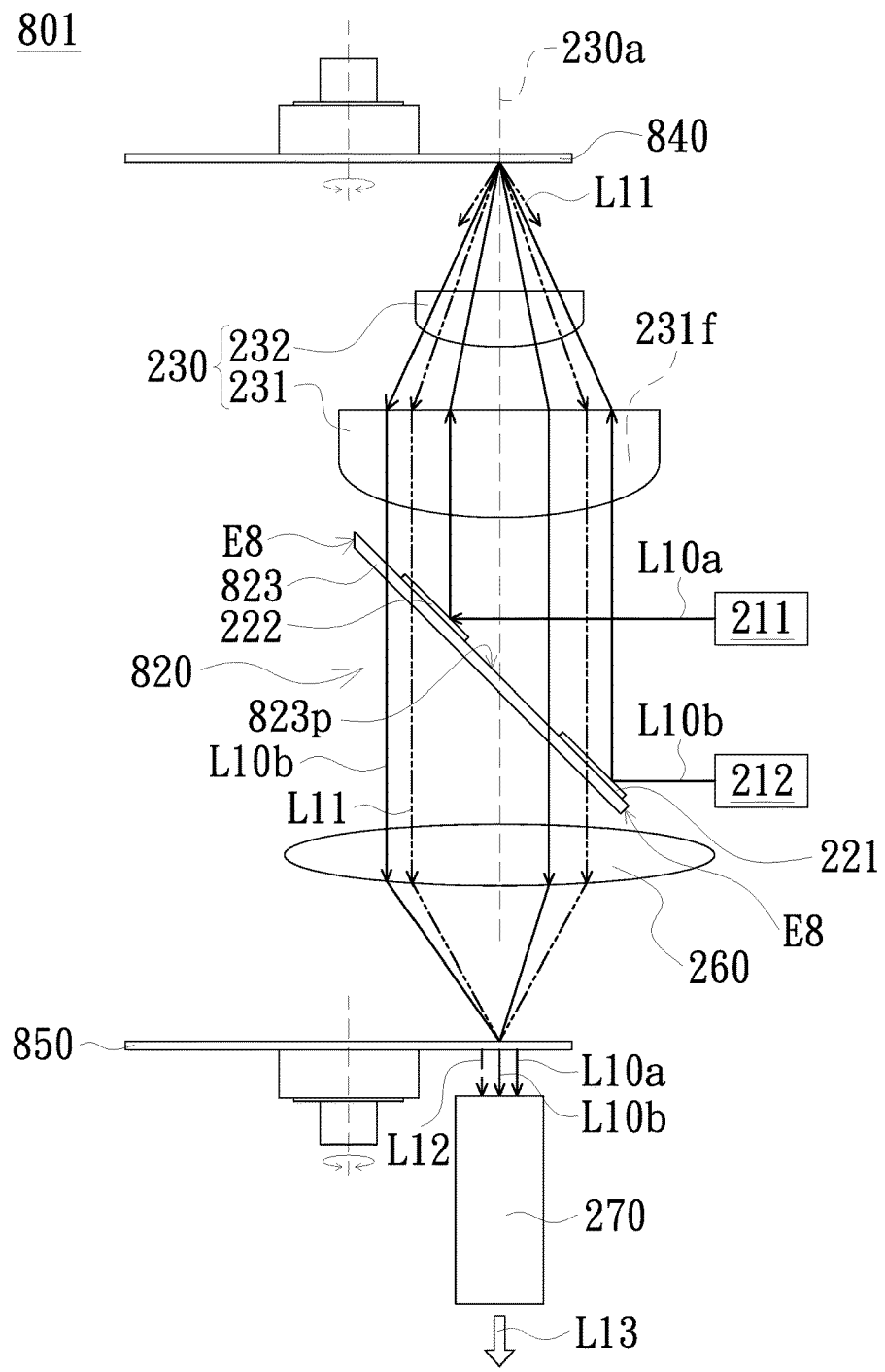
FIG. 8 is a schematic view of an illumination system in accordance with another embodiment of the invention.

FIG. 8 is a schematic view of an illumination system in accordance with another embodiment of the invention. Referring to FIG. 8. The illumination system 801 is similar to the illumination system 200 of the embodiment of FIG. 2A. The illumination systems 801 and 200 have the same effect and include the same elements, such as a first excitation light source 211, a second excitation light source 212, a lens group 230, a phosphor wheel 840 and a filter wheel 850. The phosphor wheel 840 may be the phosphor wheel 240, 340, 540, 640, 740a, 740b or 740c of the aforementioned embodiments and the filter wheel 850 may be the filter wheel 250 or 450 of the aforementioned embodiments. The same features of the illumination systems 801 and 200 will not be described repeatly, and only the main difference between the illumination systems 801 and 200, that is, the dichroic device 820, will be described below.

Compared with the dichroic device 220 in FIG. 2A, the dichroic device 820 also includes a first dichroic layer 221, a second dichroic layer 222 and a transparent substrate 823, wherein the transparent substrate 823 has a plane 823p and is also a glass plate or an acrylic plate for example; however, unlike the dichroic device 220, the first dichroic layer 221a nd the second dichroic layer 222 are formed on the same plane 823p and are separated from each other. The optical axis 230a passes through the plane 823p located between the first dichroic layer 221 and the second dichroic layer 222 but not pass through the first dichroic layer 221 and the second dichroic layer 222.

The projection region collectively formed by projecting the first dichroic layer 221 and the second dichroic layer 222 on the light flux cross-section 231f in the direction parallel to the optical axis 230a may be the same as the projection region Z20b or Z20c shown in FIG. 2B or 2C. Thus, the projection region in FIG. 8 is also larger than the ¼ area of the light flux cross-section 231f and smaller than the ½ area of the light flux cross-section 231f. In addition, the transparent substrate 823 also has a pair of beveled edges E8, and the beveled edges E8 are parallel to the optical axis 230a, as shown in FIG. 8.

Figure 9:
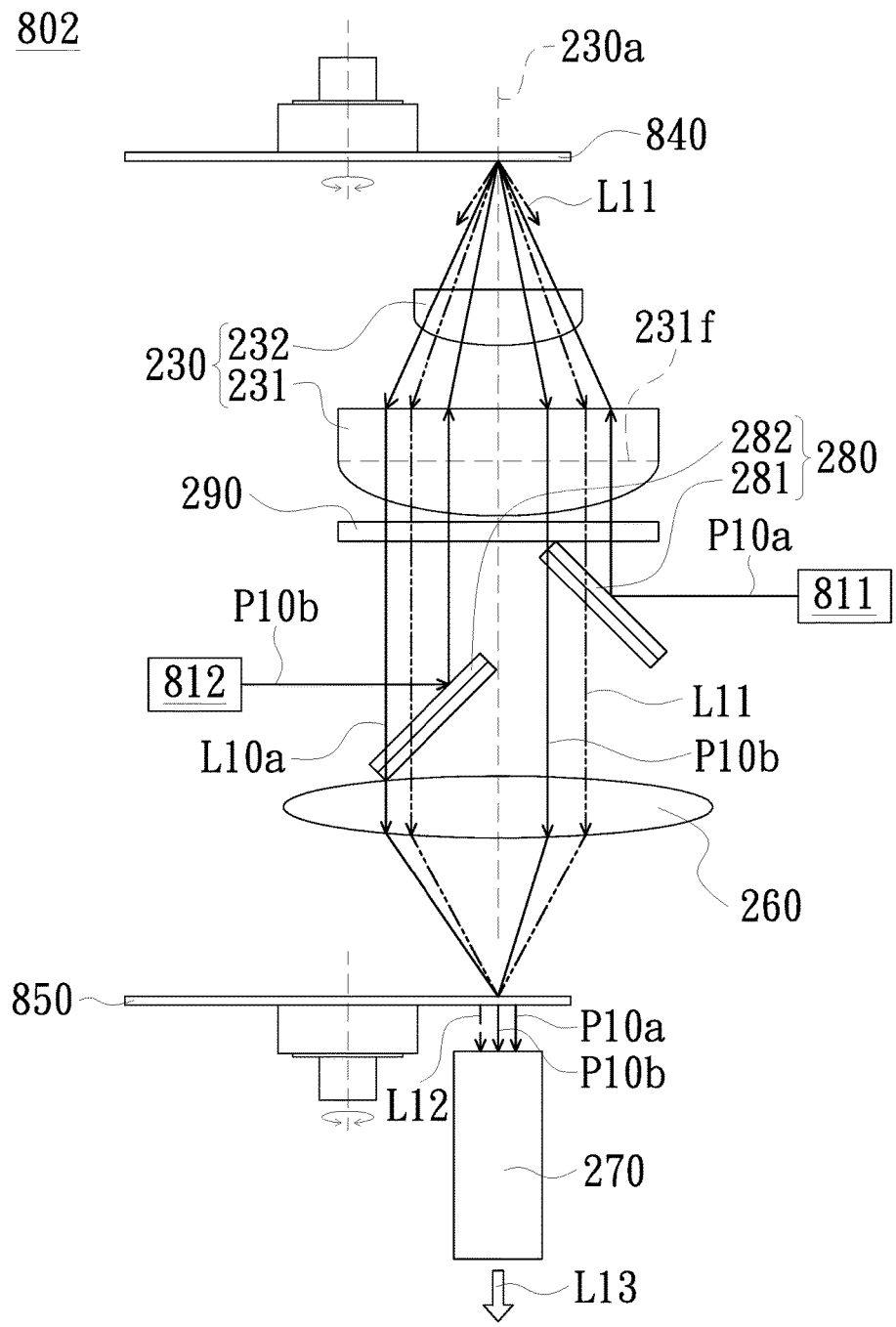
FIG. 9 is a schematic view of an illumination system in accordance with another embodiment of the invention.

FIG. 9 is a schematic view of an illumination system in accordance with another embodiment of the invention. Referring to FIG. 9. The illumination system 802 is similar to the illumination system 801 of the embodiment of FIG. 8, and the illumination systems 802 and 801 include the same elements. However, unlike the illumination system 801, the illumination system 802 further includes a phase delay member 290, and the first excitation light source 811, the second excitation light source 812 and the dichroic device 280 included in the illumination system 802 are different from those in the aforementioned embodiments.

The first excitation light source 811 and the second excitation light source 812 both have a polarizer capable of emitting a linearly polarized light (not shown). Taking FIG. 9 as an example. The first excitation beam P10a emitted from the first excitation light source 811 and the second excitation beam P10b emitted from the second excitation light source P10b both are a first linearly polarized light having a first polarization direction. The dichroic device 280 includes a first dichroic layer 281 and a second dichroic layer 282. The first dichroic layer 281 and the second dichroic layer 282 can reflect the first linearly polarized light and allow a second linearly polarized light to penetrate, wherein the second linearly polarized light has a second polarization direction perpendicular to the first polarization direction.

The phase delay member 290 is disposed between the dichroic device 280 and the lens group 230 and is located on the transmission path of the first excitation beam P10a and the second excitation beam P10b. The phase delay member 290 is a quarter wave plate and therefore is able to change the polarization state of the first excitation beam P10a and the second excitation beam P10b. As shown in FIG. 9, the first excitation beam P10a and the second excitation beam P10b penetrate the phase delay member 290 twice. Thereafter, since the phase delay member 290 is a quarter wave plate, the first excitation beam P10a and the second excitation beam P10b are converted into the second linearly polarized light by the phase delay member 290 after penetrating the phase delay member 290 twice. Therefore, the first excitation beam P10a and the second excitation beam P10b from the phase delay member 290 can penetrate the first dichroic layer 281 and the second dichroic layer 282 so as to enter the light integration rod 270.

Figure 10A:
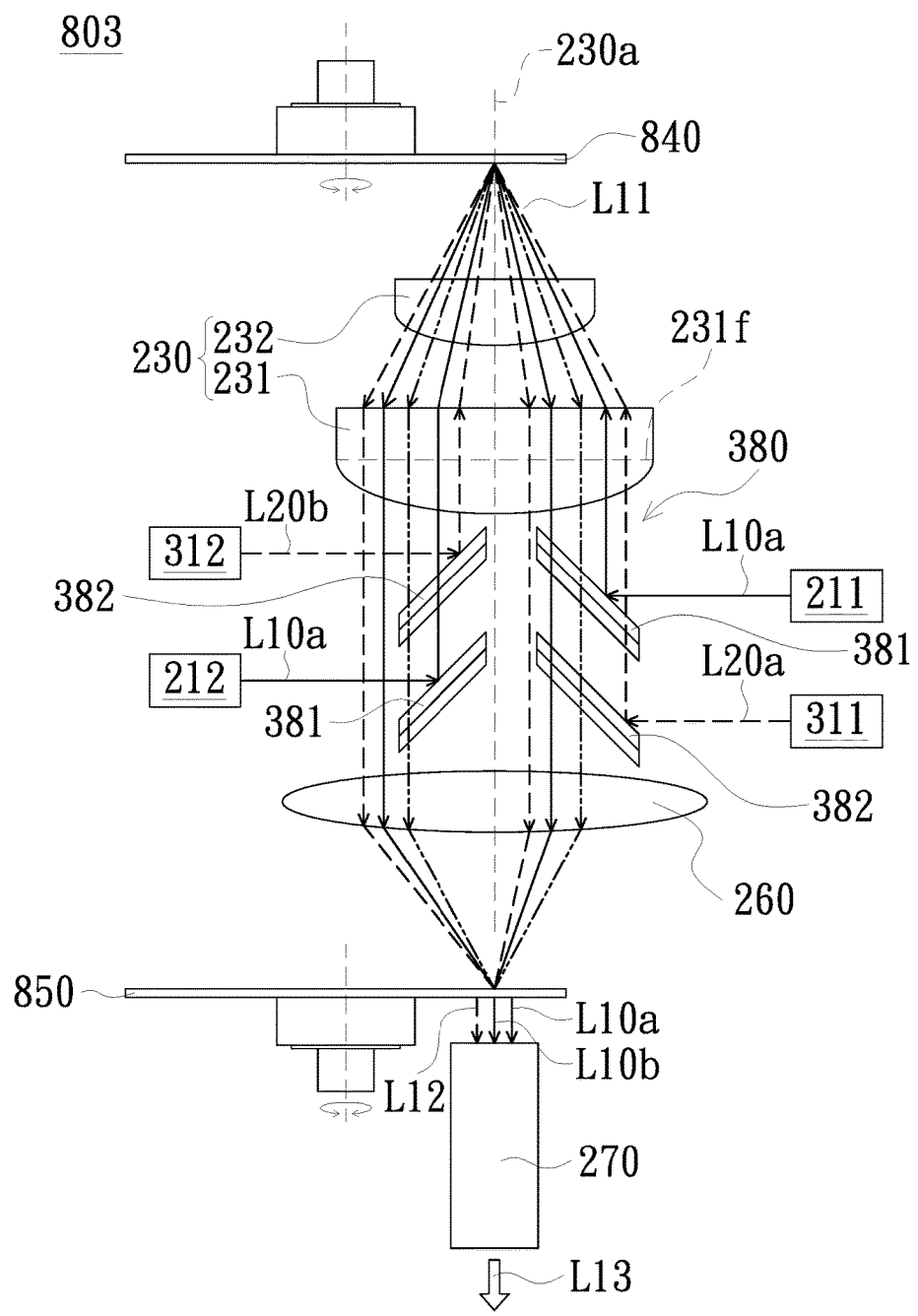
FIG. 10A is a schematic view of an illumination system in accordance with another embodiment of the invention.

FIG. 10A is a schematic view of an illumination system in accordance with another embodiment of the invention. Referring to FIG. 10A. The illumination system 803 is similar to the illumination system 200 of the embodiment of FIG. 2A, and the illumination systems 803 and 200 include the same elements. However, there are still some differences between the illumination systems 803 and 802, and the main difference between the two is that the illumination system 803 further includes at least one supplemental light source. Taking FIG. 10A as an example. The illumination system 803 includes two supplemental light sources: a first supplemental light source 311 and a second supplemental light source 312.

The first supplemental light source 311 and the second replenishing light source 312 are used to emit the first supplemental beam L20a and the second supplemental beam L20b, respectively. The wavelength of the first supplemental beam L20a may be the same as the wavelength of the second supplemental beam L20b, and the difference between the wavelengths of the first excitation beam L10a (or the second excitation beam L10b) and the first supplemental beam L20a (or the second supplemental beam L20b) is between 50 nm and 300 nm. For example, the wavelengths of the first supplemental beam L20a and the second supplemental beam L20b may be 635 nm, that is, the first supplemental beam L20a and the second supplemental beam L20b may be a red light. When the wavelengths of the first excitation beam L10a and the second excitation beam L10b are 445 or 354 nm, the difference between the wavelengths of the first excitation beam L10a and the first supplemental beam L20a may be 190 nm or 281 nm.

The illumination system 803 includes a dichroic device 380. In the embodiment of FIG. 10A, the dichroic device 380 includes a plurality of first dichroic layers 381 and a plurality of second dichroic layers 382. The first dichroic layers 381 and the second dichroic layers 382 can be projected on the light flux cross-section 231f in the direction parallel to the optical axis 230a to collectively form a projection region on the light flux cross-section 231f, wherein the projection region is collectively formed by projecting the first dichroic layers 381 and the second dichroic layers 382 on the light flux cross-section 231f in the direction parallel to the optical axis 230a.

As shown in FIG. 10A, the first dichroic layers 381 and the second dichroic layers 382 are overlapped with each other in the direction parallel to the optical axis 230a, so that the overlapping region formed by projecting the first dichroic layers 381 on the optical cross-section 231f and the overlapping region formed by projecting the second dichroic layers 382 on the optical cross-section 231f are overlapped with each other. Therefore, the area of the aforementioned projection region is not equal to the area where the overlapping region formed by the first dichroic layers 381 added by the overlapping region formed by the second dichroic layers 382. In addition, the aforementioned projection region is also larger than the ¼ area of the light flux cross-section 231f and smaller than the ½ area of the light flux cross-section 231f, and the optical axis 230a neither passes through any of the first dichroic layers 381 and the second dichroic layers 382.

The first dichroic layers 381 are, for example, the first dichroic layer 221 or the second dichroic layer 222 in FIG. 2A and are used to reflect the first excitation beam L10a and the second excitation beam L10b to the lens group 230. The second dichroic layers 382 are used to reflect the first supplemental beam L20a and the second supplemental beam L20b, and also reflect the first supplemental beam L20a and the second supplemental beam L20b to the lens group 230. The phosphor wheel 840 is located on the transmission path of the first excitation beam L10a, the second excitation beam L10b, the first supplemental beam L20a and the second supplemental beam L20b, so as to be able to receive the first excitation beam L10a, the second excitation beam L10b, the first supplemental beam L20a and the second supplemental beam L20b passing through the lens group 230.

The phosphor region of the phosphor wheel 840 (e.g., the phosphor regions 24y and 24g in FIG. 2D) can convert the first excitation beam L10a and the second excitation beam L10b passing through the lens group 230 into the conversion beam L12 and reflect the conversion beam L12 to the lens group 230, wherein the conversion beam L12 can penetrate the first dichroic layers 381 and the second dichroic layers 382. The reflective region of the phosphor wheel 840 (e.g., the reflective region 24b in FIG. 2D) can directly reflect the first excitation beam L10a and the second excitation beam L10b.

The first supplemental beam L20a and the second supplemental beam L20b are incident on the phosphor region of the phosphor wheel 840, and the phosphor region of the phosphor wheel 840 reflects the first supplemental beam L20a and the second supplemental beam L20b to the lens group 230, wherein the first supplemental beam L20a and the second supplemental beam L20b penetrate the first dichroic layers 381 after penetrating the lens group 230. The phosphor material in the phosphor region (e.g., the phosphor material 242y in FIG. 2E) is basically not excited by the first supplemental beam L20a and the second supplemental beam L20b, so that the first supplemental beam L20a and the second supplemental beam L20b are not converted into the conversion beam L12. In addition, the phosphor material scatters the first supplemental beam L20a and the second supplemental beam L20b when the phosphor material is a phosphor powder.

It is to be noted that in the embodiment of FIG. 10A, the illumination system 803 includes two supplemental light sources (the first supplemental light source 311 and the second supplemental light source 312) and two excitation light sources (the first excitation light source 211 and the second excitation light source 212) and the dichroic device 380 includes four dichroic layers. However, in other embodiments, the illumination system 803 may include one supplemental light source and one excitation light source and the dichroic device 380 may include two dichroic layers, as shown in FIG. 10B.

Figure 10B:
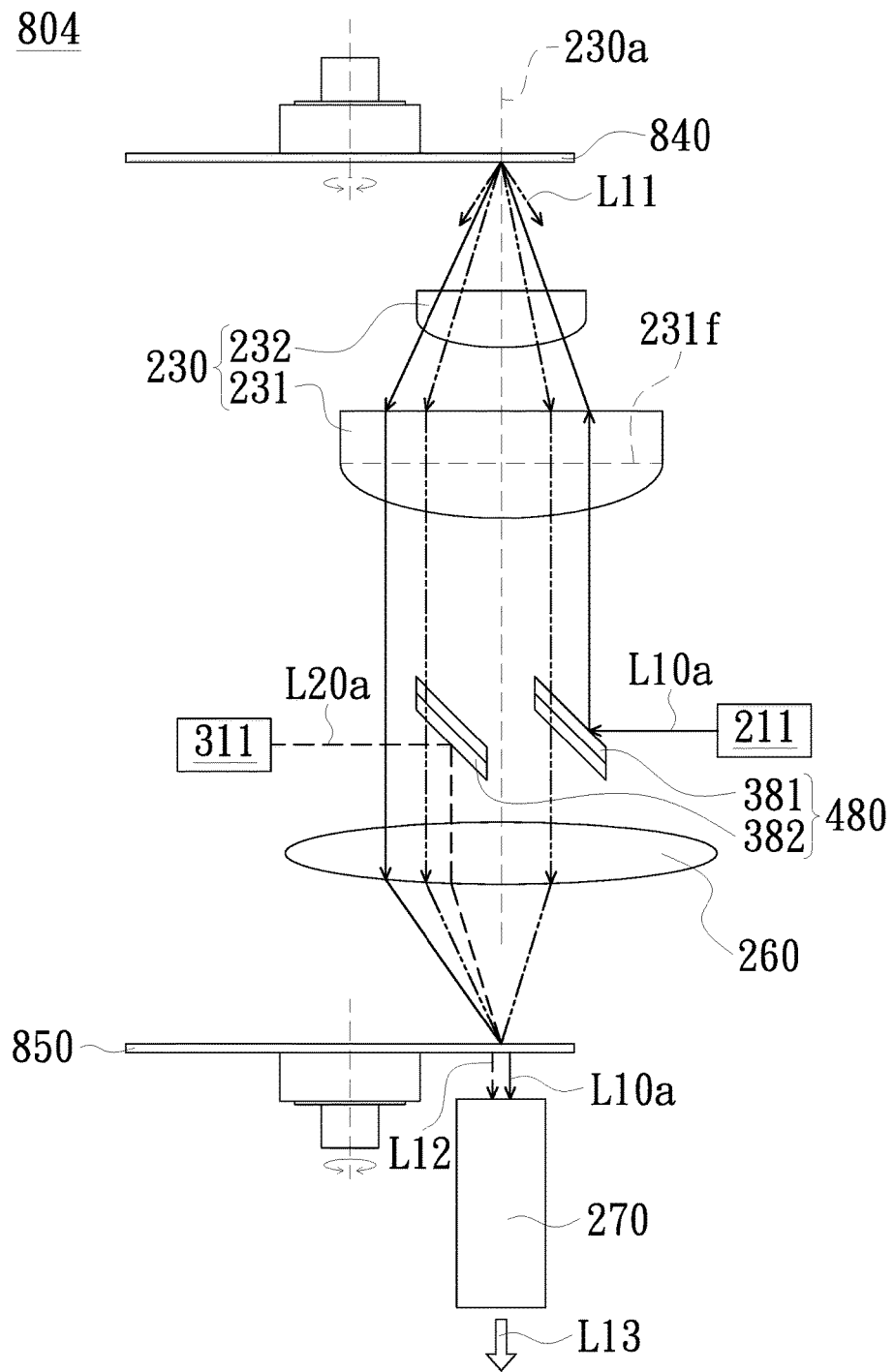
FIG. 10B is a schematic view of an illumination system in accordance with another embodiment of the invention.

FIG. 10B is a schematic view of an illumination system in accordance with another embodiment of the invention. Referring to FIG. 10B. The illumination system 804 is similar to the illumination system 803 of the embodiment of FIG. 10A and both include the same elements. However, in the illumination system 804, the number of supplemental light sources is only one and the number of excitation light sources is also one. In addition, the number of dichroic layers included in the dichroic device 480 of the illumination system 804 is two, which is different from that the embodiment of FIG. 10A has four dichroic layers. The same features of the illumination systems 803 and 804 will not be described repeatly, and only the main difference between the illumination systems 803 and 804 will be described below.

The illumination system 804 includes a first supplemental light source 311 and a first excitation light source 211, and the dichroic device 480 includes a first dichroic layer 381 and a second dichroic layer 382. The first excitation light source 211 and the first supplemental light source 311 emit the first excitation beam L10a and the first supplemental beam L20a toward the first dichroic layer 381 and the second dichroic layer 382, respectively. The first dichroic layer 381 reflects the first excitation beam L10a to the lens group 230 but the second dichroic layer 382 reflects the first supplemental beam L20a to the light receiving member 260, so that the first supplemental beam L20a sequentially passes through the light receiving member 260, the filter wheel 850 and the light integrating rod 270 without passing through the lens group 230 and the phosphor wheel 840. In other words, neither the lens group 230 nor the phosphor wheel 840 is disposed on the transmission path of the first supplemental beam L20a. Further, the filter portion of the filter wheel 850 (e.g., the filter portion 25r) can filter the first supplemental beam L20a and convert the first supplemental beam L20a and the conversion beam L11 into the filter beam L12.

Figure 10C:
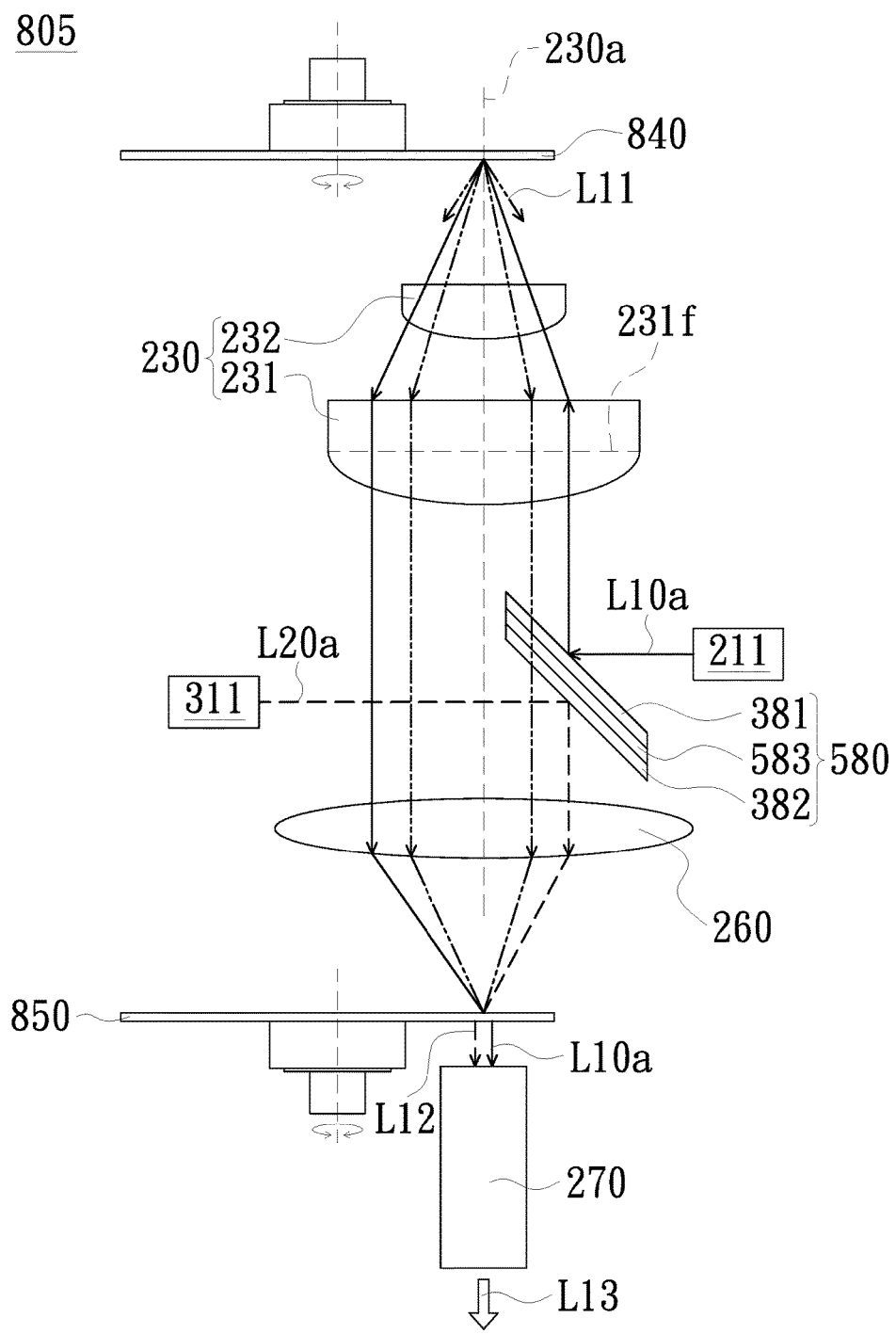
FIG. 10C is a schematic view of an illumination system in accordance with another embodiment of the invention.

FIG. 10C is a schematic view of an illumination system in accordance with another embodiment of the invention. Referring to FIG. 10C. The illumination system 805 is similar to the illumination system 804 of the embodiment of FIG. 10B, and both include the same elements. The only difference from the illumination system 804 is that the dichroic device 580 included in the illumination system 805. Specifically, the dichroic device 580 includes a first dichroic layer 381, a second dichroic layer 382 and a substrate 583. The first dichroic layer 381 and the second dichroic layer 382 are formed on the two opposite sides of the substrate 583, respectively, and the substrate 583 may be a transparent substrate 223a or 223b (refer to FIG. 2A). The first dichroic layer 381 is located between the lens group 230 and the second dichroic layer 382, so that the first dichroic layer 381 can reflect the first excitation beam L10a to the lens group 230 and the second dichroic layer 382 can reflect the first supplemental beam L20a to the light receiving member 260.

Figure 11:
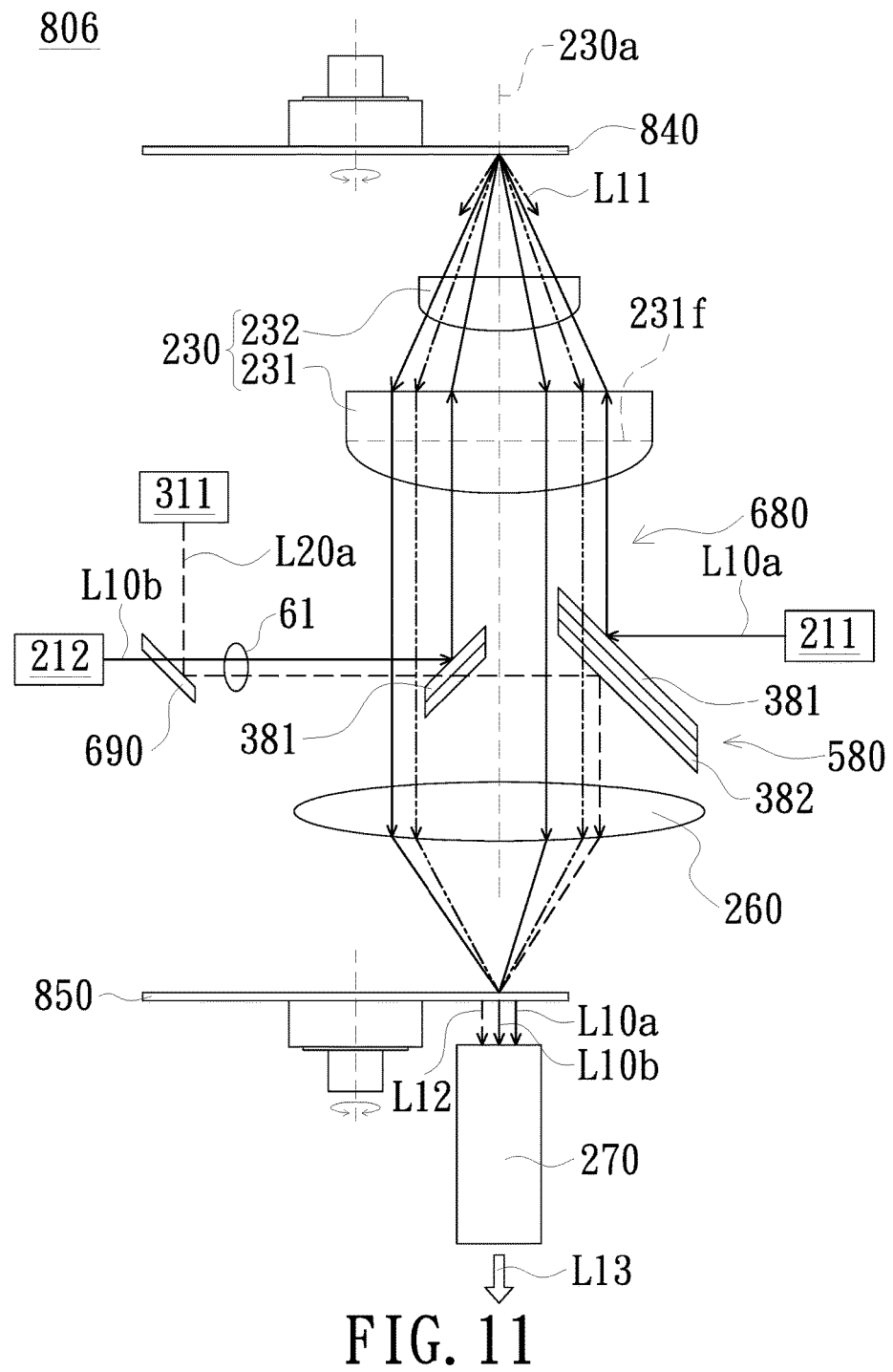
FIG. 11 is a schematic view of an illumination system in accordance with another embodiment of the invention.

FIG. 11 is a schematic view of an illumination system in accordance with another embodiment of the invention. Referring to FIG. 11. The illumination system 806 is similar to the illumination system 805 of the embodiment of FIG. 10C, and both includes the same elements. The same features of the illumination systems 806 and 805 will not be described repeatly, and only the main difference between the illumination systems 806 and 805 will be described below.

Unlike the illumination system 805 of FIG. 10C, the illumination system 806 further includes a second excitation light source 212 and a dichroic mirror 690. In addition, the illumination system 806 includes a dichroic device 680, and the dichroic device 680 includes a dichroic device 580 and a first dichroic layer 381, wherein the dichroic device 580 also includes a first dichroic layer 381 and a second dichroic layer 382. In other words, the dichroic device 680 includes two first dichroic layers 381 and one second dichroic layer 382.

In the illumination system 806 of FIG. 11, the dichroic mirror 690 is disposed on the transmission path of the second excitation beam L10*b* and the first supplemental beam L20*a*. The dichroic mirror 690 can reflect the first supplemental beam L20*a* and allow the second excitation beam L10*b* to penetrate. The dichroic mirror 690 can reflect the first supplemental beam L20*a* to the second dichroic layer 382, wherein the first supplemental beam L20*a* first penetrates the first dichroic layer 381 located outside the dichroic device 580 before being incident on the second dichroic layer 382. The second excitation beam L10*b* is incident on the first dichroic layer 381 after penetrating the dichroic mirror 690 and is reflected to the lens group 230 by the first dichroic layer 381, as shown in FIG. 11.

As shown in FIG. 11, the dichroic mirror 690 does not have any projection on the light flux cross-section along the direction parallel to the optical axis, so that the optical axis 230*a* does not pass through the dichroic mirror 690. In addition, it is to be noted that in the embodiment, the illumination system 806 may further include a focus mirror 61, which is disposed on the transmission path of the second excitation beam L10*b* and the first supplemental beam L20*a* to converge the second excitation beam L10*b* and the first supplemental beam L20*a* from the dichroic mirror 690.

Figure 12A:
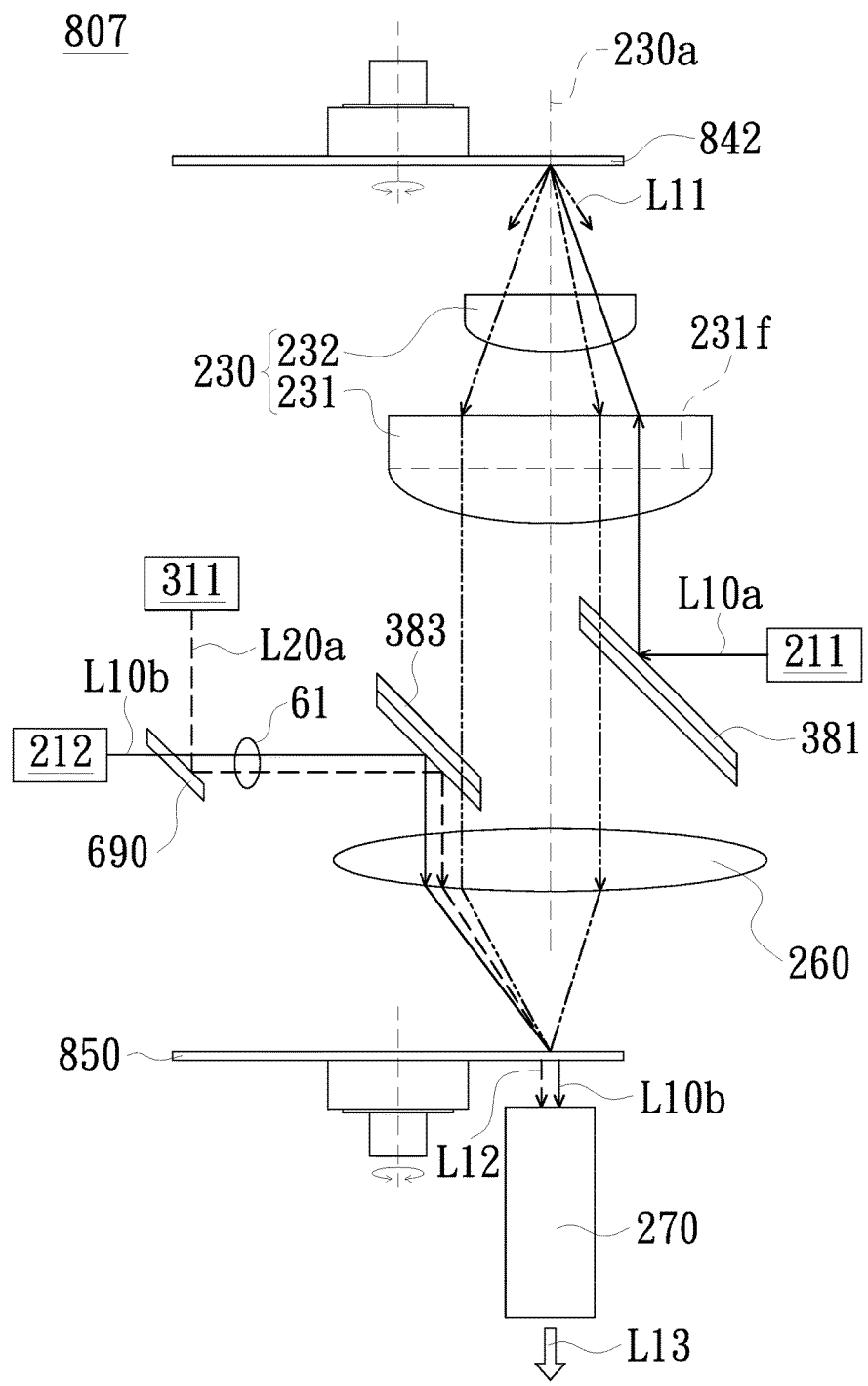
FIG. 12A is a schematic view of an illumination system in accordance with another embodiment of the invention.

FIG. 12A is a schematic view of an illumination system in accordance with another embodiment of the invention. Referring to FIG. 12A. The illumination system 807 is similar to the illumination system 806 of the embodiment of FIG. 11, and both include the same elements. The same features of the illumination systems 807 and 806 will not be described repeatly, and only the main difference between the illumination systems 807 and 806 will be described below.

The illumination system 807 includes a dichroic mirror 383 and one layer of first dichroic layer 381. Compared with the illumination system 806 of FIG. 11, the dichroic mirror 383 in FIG. 12A replaces the first dichroic layer 381 outside the dichroic device 580 in FIG. 11 and the first dichroic layer 381 in FIG. 12A replaces the dichroic device 580 in FIG. 11. In the embodiment of FIG. 12A, the dichroic mirror 383 can reflect the second excitation beam L10*b* and the first supplemental beam L20*a* to the light receiving member 260. Thus, the second excitation beam L10*b* and the first supplemental beam L20*a* can be directly incident on the light receiving member 260 without passing through the lens group 230, so that the second excitation beam L10*b* can pass through the filter wheel 850 and the filter wheel 850 can convert the first supplemental beam L20*a* and the conversion beam L11 into the filter beam L12.

Figure 12B:
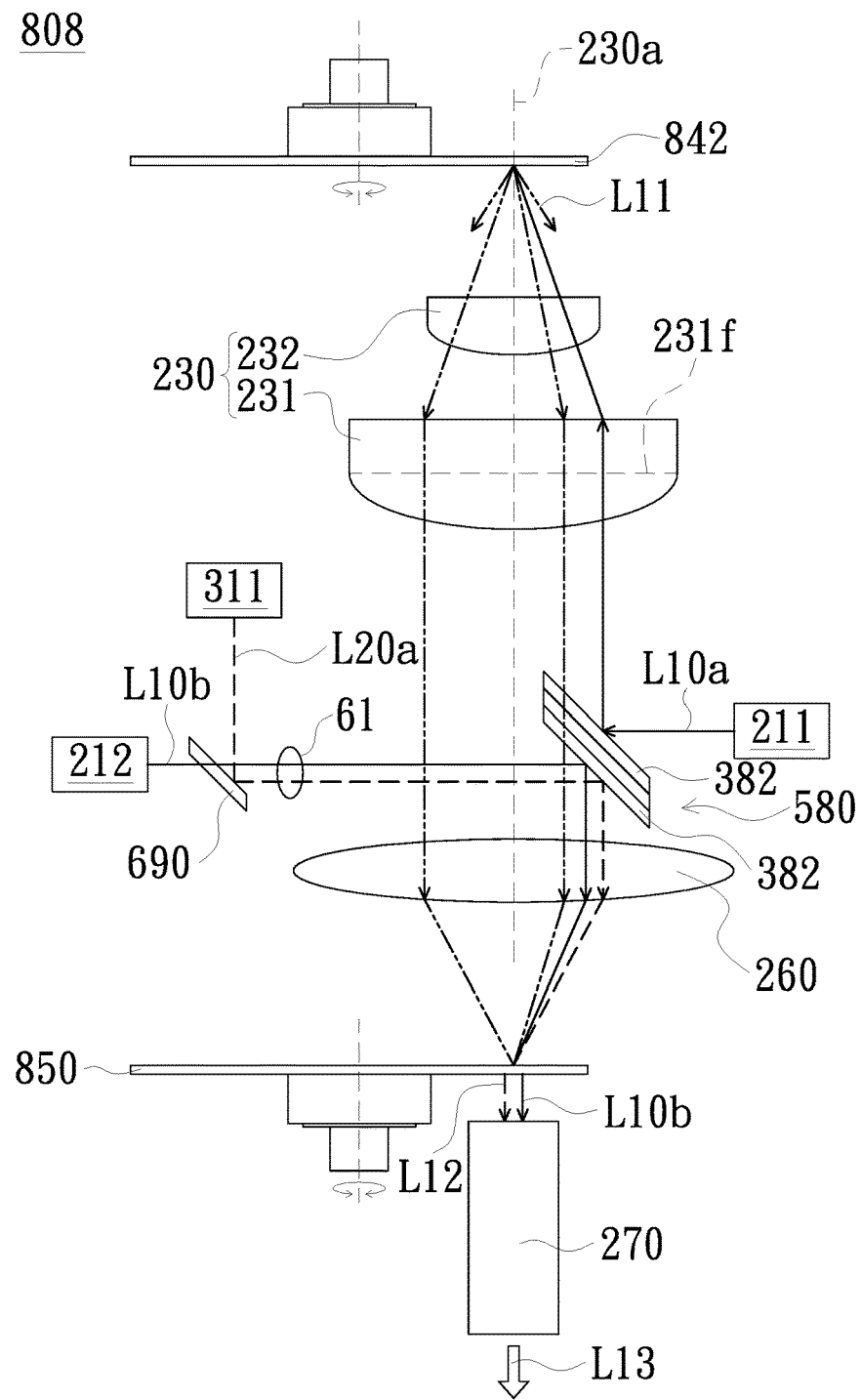
FIG. 12B is a schematic view of an illumination system in accordance with another embodiment of the invention.

The illumination system 807 further includes a phosphor wheel 842. The first dichroic layer 381 can reflect the first excitation beam L10*a* to the lens group 230, so that the first excitation beam L10*a* passing through the lens group 230 can be incident on the phosphor wheel 842. Unlike the phosphor wheel 840 in the aforementioned embodiment, the phosphor wheel 842 has only a phosphor region and does not have any reflective region. Therefore, the first excitation beam L10*a* is converted into the conversion beam L11 by the phosphor wheel 842 after being incident on the phosphor wheel 842 L11 instead of being directly reflected by the phosphor wheel 842. In addition, it is to be noted that in the illumination system 807, the dichroic mirror 383 may be omitted and the first dichroic layer 381 may be replaced by the dichroic device 580, thereby simplifying the architecture of the illumination system 807 as the illumination system 808 of FIG. 12B.

Figure 13:
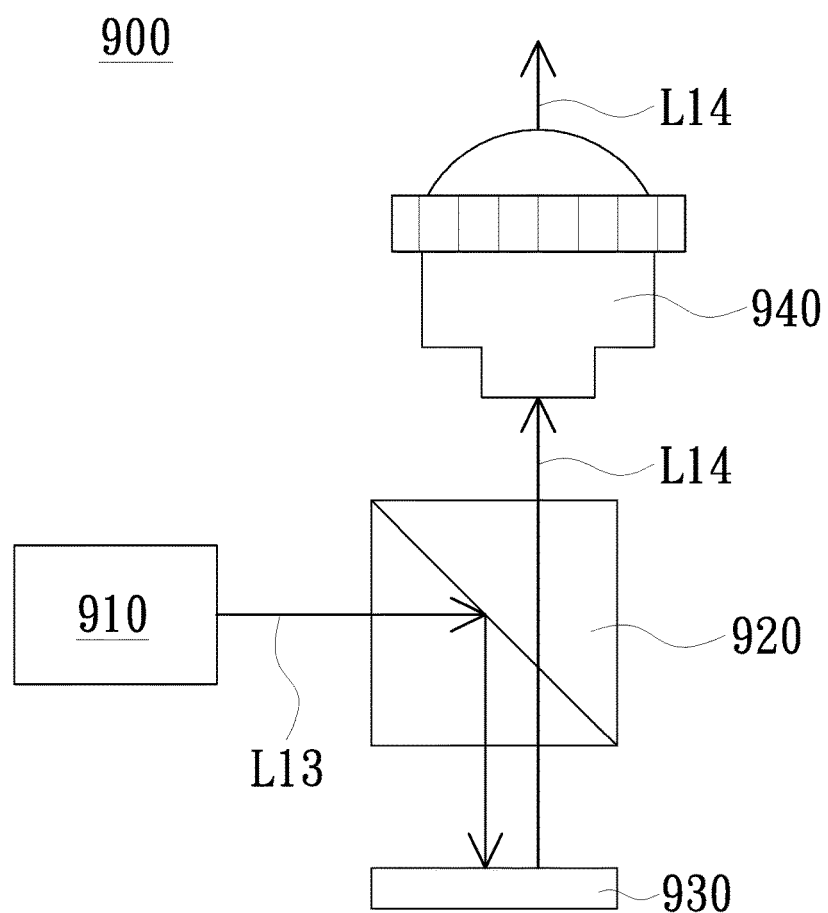
FIG. 13 is a schematic view of a projector in accordance with an embodiment of the invention.

The illumination systems described in the above embodiments all can be used for a projector. Referring to FIG. 13. The projector 900 includes an illumination system 910, a reflective element 920, a light valve unit 930 and a projection lens 940. The illumination system 910 is the illumination system 200, 801, 802, 803, 804, 805, 806, 807 or 808 of the aforementioned embodiment and can generate an illumination beam L13. The reflective element 920 is used to guide the illumination beam L13 to the light valve unit 930, and the reflective element 920 is, for example, a mirror or a total internal reflection (TIR) prism, but is not limited thereto. The light valve unit 930 is disposed on the transmission path of the illumination beam L13 and can convert the illumination beam L13 into an image beam L14. The projection lens 940 is disposed on the transmission path of the image beam L14 and can project the image beam L14 onto the screen to form an image screen. In addition, the light valve unit 930 may include a reflective liquid crystal on silicon (LCOS) or a digital micro-mirror device (DMD), etc., and a transmissive spatial light modulator such as a transparent liquid crystal panel. In addition, depending on the input control signal scheme, the light modulator 120 is, for example, an optical addressable spatial light modulator (OASLM) or an electrically addressed spatial light modulator (EASLM). However, the invention does not limit the type of the optical modulator 120 and its type.

In summary, by using the configuration among the at least two light sources (e.g., two excitation light sources, or one excitation light source and one supplemental light source), at least two layers of dichroic layers (e.g., the first dichroic layer and the second dichroic layer) and the lens group, the projection region formed by the dichroic layers on the light flux cross-section is not passed through by the optical axis of the lens group and the area of the projection region is larger than the ¼ area of the light flux cross-section and smaller than the ½ area of the light flux cross-section. Thus, the lens group can deflect the excitation beam, so that the excitation beam emitted from the phosphor wheel is not all blocked by the dichroic layers or even completely not blocked by the dichroic layers. Compared with the conventional illumination systems, the invention clearly employs fewer optical elements and has a simpler optical layout, thereby helping to reduce cost and volume.

The foregoing description of the preferred embodiment of the invention has been presented for purposes of illustration and description. It is not intended to be exhaustive or to limit the invention to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to best explain the principles of the invention and its best mode practical application, thereby to enable persons skilled in the art to understand the invention for various embodiments and with various modifications as are suited to the particular use or implementation contemplated. It is intended that the scope of the invention be defined by the claims appended hereto and their equivalents in which all terms are meant in their broadest reasonable sense unless otherwise indicated. Therefore, the term "the invention", "the invention" or the like is not necessary limited the claim scope to a specific embodiment, and the reference to particularly preferred exemplary embodiments of the invention does not imply a limitation on the invention, and no such limitation is to be inferred. The invention is limited only by the spirit and scope of the appended claims. Moreover, these claims may refer to use "first", "second", etc. following with noun or element. Such terms should be understood as a nomenclature and should not be construed as giving the limitation on the number of the elements modified by such nomenclature unless specific number has been given. The abstract of the disclosure is provided to comply with the rules requiring an abstract, which will allow a searcher to quickly ascertain the subject matter of the technical disclosure of any patent issued from this disclosure. It is submitted with the understanding that it will not be used to interpret or limit the scope or meaning of the claims. Any advantages and benefits described may not apply to all embodiments of the invention. It should be appreciated that variations may be made in the embodiments described by persons skilled in the art without departing from the scope of the invention as defined by the following claims. Moreover, no element and component in the disclosure is intended to be dedicated to the public regardless of whether the element or component is explicitly recited in the following claims. Furthermore, the terms such as the first stop part, the second stop part, the first ring part and the second ring part are only used for distinguishing various elements and do not limit the number of the elements.

What is claimed is:

1. An illumination system, comprising:
a lens group, having an optical axis and a light flux cross-section perpendicular to the optical axis;
a dichroic device, comprising:
a first dichroic layer, adapted for reflecting a first excitation beam to the lens group;
a second dichroic layer, adapted for reflecting a second excitation beam to the lens group, wherein a projection region collectively formed by projecting the first dichroic layer and the second dichroic layer on the light flux cross-section in a direction parallel to the optical axis is larger than a ¼ area of the light flux cross-section and smaller than a ½ area of the light flux cross-section, and the optical axis does not pass through the first dichroic layer and the second dichroic layer;
a first excitation light source, adapted for emitting the first excitation beam toward the first dichroic layer; and
a second excitation light source, adapted for emitting the second excitation beam toward the second dichroic layer; and
a phosphor wheel, adapted for receiving the first excitation beam and the second excitation beam passing through the lens group and having a reflective region and at least one phosphor region, wherein the at least one phosphor region is adapted for converting the first excitation beam and the second excitation beam into a conversion beam and reflecting the conversion beam to the lens group, and the reflective region is adapted for reflecting the first excitation beam and the second excitation beam back to the lens group, wherein the conversion beam penetrates the first dichroic layer and the second dichroic layer.

2. The illumination system according to claim 1, wherein the phosphor wheel comprises:
a turntable, having a light receiving surface, wherein the light receiving surface is divided into the reflective region and the at least one phosphor region; and
at least one phosphor material, disposed in the at least one phosphor region and adapted for converting the first excitation beam and the second excitation beam into the conversion beam.

3. The illumination system according to claim 2, wherein the phosphor wheel further comprises:
an optical microstructure, formed on the light receiving surface and located in the reflective region, wherein the optical microstructure is adapted for scattering the first excitation beam and the second excitation beam.

4. The illumination system according to claim 3, wherein the optical microstructure is a plurality of protrusions or a plurality of recesses formed on the light receiving surface.

5. The illumination system according to claim 2, wherein the phosphor wheel further comprises:
a light diffusion film, formed on the light receiving surface and located in the reflective region.

6. The illumination system according to claim 2, wherein the turntable further has an inclined portion located on the light receiving surface, and the inclined portion is located in the reflective region and has a bevel inclined with respect to the light receiving surface.

7. The illumination system according to claim 6, wherein a height of the inclined portion with respect to the light receiving surface decreases from a center of the turntable toward a direction away from the center.

8. The illumination system according to claim 6, wherein a height of the inclined portion with respect to the light receiving surface increases from a center of the turntable toward a direction away from the center.

9. The illumination system according to claim 2, wherein the turntable further has a plurality of inclined portions located on the light receiving surface, and each of the inclined portions is located in the reflective region and has a bevel, wherein each of the bevels is inclined with respect to the light receiving surface, and the inclined portions are arranged in a straight line along a radius of the turntable.

10. The illumination system according to claim 9, wherein a height of each of the inclined portions with respect to the light receiving surface decreases from a center of the turntable toward a direction away from the center.

11. The illumination system according to claim 9, wherein a height of each of the inclined portions with respect to the light receiving surface increases from a center of the turntable toward a direction away from the center.

12. The illumination system according to claim 1, wherein the phosphor wheel comprises:
an auxiliary phosphor material, disposed in the reflective region and adapted for converting a portion of the first excitation beam and a portion of the second excitation light into an auxiliary color light.

13. The illumination system according to claim 12, wherein the auxiliary phosphor material partially or completely covers the reflective region.

14. The illumination system according to claim 1, wherein the dichroic device further comprises two transparent substrates, each of the transparent substrates has a plane, and the first dichroic layer and the second dichroic layer are formed on the planes of the transparent substrates respectively.

15. The illumination system according to claim 14, wherein each of the transparent substrates has a beveled edge, and the beveled edges are parallel to the optical axis.

16. The illumination system according to claim 1, wherein the dichroic device further comprises a transparent substrate, the transparent substrate has a plane, the first dichroic layer and the second dichroic layer are formed on the plane, the first dichroic layer and the second dichroic layer are separated from each other, and the optical axis passes through the plane located between the first dichroic layer and the second dichroic layer.

17. The illumination system according to claim 16, wherein the transparent substrate has a beveled edge and the beveled edge is parallel to the optical axis.

18. The illumination system according to claim 1, wherein a wavelength of the first excitation beam is different from a wavelength of the second excitation beam, and a difference between the wavelengths of the first excitation beam and the second excitation beam is between 10 nm and 100 nm.

19. The illumination system according to claim 18, wherein the first dichroic layer and the second dichroic layer are located on a transmission path of the first excitation beam and the second excitation beam, the first excitation beam reflected by the reflective region penetrates the second dichroic layer, and the second excitation beam reflected by the reflective region penetrates the first dichroic layer.

20. The illumination system according to claim 1, wherein a wavelength of the first excitation beam is the same as a wavelength of the second excitation beam.

21. The illumination system according to claim 1, further comprising:
a phase delay member, disposed between the dichroic device and the lens group, wherein the phase delay member is located on a transmission path of the first excitation beam and the second excitation beam.

22. The illumination system according to claim 21, wherein the phase delay member is a quarter wave plate, the first excitation beam emitted from the first excitation light source and the second excitation beam emitted from the second excitation light source both are a first linearly polarized light having a first polarization direction, wherein after the first excitation beam and the second excitation beam penetrate the phase delay member twice, the phase delay member converts the first excitation beam and the second excitation beam into a second linearly polarized light having a second polarization direction perpendicular to the first polarization direction, wherein the second linearly polarized light penetrates the first dichroic layer and the second dichroic layer.

23. The illumination system according to claim 1, further comprising:
a light receiving member, adapted for converging the first excitation beam, the second excitation beam and the conversion beam, wherein the dichroic device is disposed between the light receiving member and the lens group.

24. The illumination system according to claim 1, further comprising:
a filter wheel, disposed on a transmission path of the conversion beam, the first excitation beam and the second excitation beam and adapted for forming a plurality of filter beams, wherein the lens group is disposed between the filter wheel and the phosphor wheel.

25. The illumination system according to claim 24, wherein the filter wheel has a light penetrating portion allowing the first excitation beam and the second excitation beam to penetrate, and the light penetrating portion has a surface scattering structure or a plurality of light scattering particles.

26. The illumination system according to claim 25, further comprising:
a light integrating rod, adapted for receiving the first excitation beam, the second excitation beam and the filter beams to form an illumination beam, wherein the filter wheel is located between the light integration rod and the dichroic device.

27. An illumination system, comprising:
a first excitation light source, adapted for emitting a first excitation beam;
a first supplemental light source, adapted for emitting a first supplemental beam, wherein a difference between the wavelengths of the first excitation beam and the first supplemental beam is between 50 nm and 300 nm;
a lens group, having an optical axis and a light flux cross-section perpendicular to the optical axis;
a dichroic device, comprising:
a first dichroic layer, adapted for reflecting the first excitation beam to the lens group; and
a second dichroic layer, adapted for reflecting the first supplemental beam, wherein a projection region collectively formed by projecting the first dichroic layer and the second dichroic layer on the light flux cross-section in a direction parallel to the optical axis is larger than a ¼ area of the light flux cross-section and smaller than a ½ area of the light flux cross-section, and the optical axis does not pass through the first dichroic layer and the second dichroic layer; and
a phosphor wheel, adapted for converting the first excitation beam passing through the lens group into a conversion beam and reflecting the conversion beam to the lens group, wherein the conversion beam penetrates the first dichroic layer and the second dichroic layer.

28. The illumination system according to claim 27, wherein the phosphor wheel comprises:
a turntable, having a light receiving surface, wherein the light receiving surface is divided into a reflective region and at least one phosphor region; and
at least one phosphor material, disposed in the at least one phosphor region and adapted for converting the first excitation beam into the conversion beam.

29. The illumination system according to claim 28, wherein the phosphor wheel further comprises:
an optical microstructure, formed on the light receiving surface and located in the reflective region, wherein the optical microstructure is adapted for scattering the first excitation beam.

30. The illumination system according to claim 29, wherein the optical microstructure is a plurality of protrusions or a plurality of recesses formed on the light receiving surface.

31. The illumination system according to claim 28, wherein the phosphor wheel further comprises:
a light diffusion film, formed on the light receiving surface and located in the reflective region.

32. The illumination system according to claim 28, wherein the turntable further has an inclined portion located on the light receiving surface, and the inclined portion is located in the reflective region and has a bevel inclined with respect to the light receiving surface.

33. The illumination system according to claim 32, wherein a height of the inclined portion with respect to the light receiving surface decreases from a center of the turntable toward a direction away from the center.

34. The illumination system according to claim 32, wherein a height of the inclined portion with respect to the light receiving surface increases from a center of the turntable toward a direction away from the center.

35. The illumination system according to claim 28, wherein the turntable further has a plurality of inclined portions located on the light receiving surface, and each of the inclined portions is located in the reflective region and has a bevel, wherein each of the bevels is inclined with respect to the light receiving surface, and the inclined portions are arranged in a straight line along a radius of the turntable.

36. The illumination system according to claim 35, wherein a height of each of the inclined portions with respect to the light receiving surface decreases from a center of the turntable toward a direction away from the center.

37. The illumination system according to claim 35, wherein a height of each of the inclined portions with respect to the light receiving surface increases from a center of the turntable toward a direction away from the center.

38. The illumination system according to claim 28, wherein the phosphor wheel comprises:
an auxiliary phosphor material, disposed in the reflective region and adapted for converting a portion of the first excitation beam into an auxiliary color light.

39. The illumination system according to claim 38, wherein the auxiliary phosphor material partially or completely covers the reflective region.

40. The illumination system according to claim 27, wherein the second dichroic layer is adapted for reflecting the first supplemental beam to the lens group, and the phosphor wheel is located on a transmission path of the first supplemental beam and reflecting the first supplemental beam to the lens group, wherein the first supplemental beam penetrates the first dichroic layer after penetrating the lens group.

41. The illumination system according to claim 27, wherein neither the lens group nor the phosphor wheel is disposed on a transmission path of the first supplemental beam.

42. The illumination system according to claim 41, wherein the dichroic device further comprises a substrate, the first dichroic layer and the second dichroic layer are formed on two opposite sides of the substrate respectivley, and the first dichroic layer is located between the lens group and the second dichroic layer.

43. The illumination system according to claim 27, further comprising:
a second excitation light source, adapted for emitting a second excitation beam; and
a dichroic mirror, disposed on a transmission path of the second excitation beam and the first supplemental beam and adapted for reflecting the first supplemental beam to the second dichroic layer and for allowing the second excitation beam to penetrate.

44. The illumination system according to claim 43, wherein the dichroic mirror has no projection on the light flux cross-section in a direction parallel to the optical axis.

45. The illumination system according to claim 27, further comprising:
a second excitation light source, adapted for emitting a second excitation beam; and
a second supplemental light source, adapted for emitting a second supplemental beam, wherein the dichroic device comprises:
a plurality of the first dichroic layers, adapted for reflecting the first excitation beam and the second excitation beam to the lens group respectively; and
a plurality of the second dichroic layers, adapted for reflecting the first supplemental beam and the second supplemental beam respectively, wherein the projection region is collectively formed by projections of the first dichroic layers and the second dichroic layers on the light flux cross-section in a direction parallel to the optical axis, and the phosphor wheel is adapted for converting the first excitation beam and the second excitation beam passing through the lens group into the conversion beam.

46. A projector, comprising:
an illumination system, comprising:
a lens group, having an optical axis and a light flux cross-section perpendicular to the optical axis;
a dichroic device, comprising:
a first dichroic layer, adapted for reflecting a first excitation beam to the lens group;
a second dichroic layer, adapted for reflecting a second excitation beam to the lens group, wherein a projection region collectively formed by projecting the first dichroic layer and the second dichroic layer on the light flux cross-section in a direction parallel to the optical axis is larger than a ¼ area of the light flux cross-section and smaller than a ½ area of the light flux cross-section, and the optical axis does not pass through the first dichroic layer and the second dichroic layer;
a first excitation light source, adapted for emitting the first excitation beam toward the first dichroic layer;
a second excitation light source, adapted for emitting the second excitation beam toward the second dichroic layer;
a phosphor wheel, adapted for receiving the first excitation beam and the second excitation beam passing through the lens group and having a reflective region and at least one phosphor region, wherein the at least one phosphor region is adapted for converting the first excitation beam and the second excitation beam into a conversion beam and reflecting the conversion beam to the lens group, and the reflective region is adapted for reflecting the first excitation beam and the second excitation beam back to the lens group, wherein the conversion beam penetrates the first dichroic layer and the second dichroic layer;
a filter wheel, disposed on a transmission path of the conversion beam, the first excitation beam and the second excitation beam and adapted for forming a plurality of filter beams; and
a light integration rod, disposed on a transmission path of the filter beams and adapted for converting the filter beams into an illumination beam;
a light valve unit, disposed on a transmission path of the illumination beam to convert the illumination beam into an image beam; and
a projection lens, disposed on a transmission path of the image beam.

47. A projector, comprising:
an illumination system, comprising:
a first excitation light source, adapted for emitting a first excitation beam;
a first supplemental light source, adapted for emitting a first supplemental beam;
a lens group, having an optical axis and a light flux cross-section perpendicular to the optical axis;

a dichroic device, comprising:
- a first dichroic layer, adapted for reflecting the first excitation beam to the lens group; and
- a second dichroic layer, adapted for reflecting the first supplemental beam, wherein a projection region collectively formed by projecting the first dichroic layer and the second dichroic layer on the light flux cross-section in a direction parallel to the optical axis is larger than a ¼ area of the light flux cross-section and smaller than a ½ area of the light flux cross-section, and the optical axis does not pass through the first dichroic layer and the second dichroic layer;
- a phosphor wheel, adapted for converting the first excitation beam passing through the lens group into a conversion beam and reflecting the conversion beam to the lens group, wherein the conversion beam penetrates the first dichroic layer and the second dichroic layer;
- a filter wheel, disposed on a transmission path of the conversion beam, the first excitation beam and the second excitation beam and adapted for forming a plurality of filter beams; and
- a light integration rod, disposed on a transmission path of the filter beams and adapted for converting the filter beams into an illumination beam;

a light valve unit, disposed on a transmission path of the illumination beam to convert the illumination beam into an image beam; and a projection lens, disposed on a transmission path of the image beam.

* * * * *